United States Patent
Priestas et al.

(10) Patent No.: US 10,489,502 B2
(45) Date of Patent: Nov. 26, 2019

(54) DOCUMENT PROCESSING

(71) Applicant: ACCENTURE GLOBAL SOLUTIONS LIMITED, Dublin (IE)

(72) Inventors: James R. Priestas, Arlington, VA (US); Tara Lynn O'Gara, Arlington, VA (US); Bogdan Sacaleanu, Dublin (IE); Urvesh Bhowan, Bray (IE); Medb Corcoran, Dublin (IE); Pedro Sacristan, Dublin (IE); Jivan Virdee, San Jose, CA (US); Thomas Doane Perry, Vienna, VA (US); Theresa M. Gaffney, Milton, MA (US); Meghan Hildebrand Fotopoulos, Philadelphia, PA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 91 days.

(21) Appl. No.: 15/922,567

(22) Filed: Mar. 15, 2018

(65) Prior Publication Data
US 2019/0005012 A1  Jan. 3, 2019

Related U.S. Application Data

(63) Continuation-in-part of application No. 15/879,031, filed on Jan. 24, 2018.
(Continued)

(51) Int. Cl.
*G06F 17/24*  (2006.01)
*G06F 17/27*  (2006.01)
(Continued)

(52) U.S. Cl.
CPC .......... *G06F 17/241* (2013.01); *G06F 16/288* (2019.01); *G06F 17/218* (2013.01); *G06F 17/278* (2013.01); *G06F 17/2785* (2013.01); *G06K 9/00456* (2013.01); *G06N 20/00* (2019.01)

(58) Field of Classification Search
CPC combination set(s) only.
See application file for complete search history.

(56) References Cited

U.S. PATENT DOCUMENTS 6,778,979 B2 *  8/2004  Grefenstette ....... G06F 16/3323
7,117,432 B1 *  10/2006  Shanahan ............. G06F 17/218
                                                  715/210

(Continued)

FOREIGN PATENT DOCUMENTS

EP     2343670     7/2011
WO    02/056196    7/2002

*Primary Examiner* — Tsung Yin Tsai
(74) *Attorney, Agent, or Firm* — Mannava & Kang, P.C.

(57) ABSTRACT

A document processing system receives an electronic document including component documents generated from various sources in different formats. Plain text data can be extracted from the electronic document in addition to formatting and structuring information. The plain text data is segmented into sections and various entities are extracted and linked from the sections. An interactive graphical user interface (GUI) that displays content including the plain text data is formatted according to the styling information and annotated entity relationships are determined from the linked entities. The GUI enables user edits to the annotated entity relationships.

20 Claims, 15 Drawing Sheets

Related U.S. Application Data

(60) Provisional application No. 62/527,441, filed on Jun. 30, 2017.

(51) Int. Cl.
*G06N 20/00* (2019.01)
*G06F 16/28* (2019.01)
*G06F 17/21* (2006.01)
*G06K 9/00* (2006.01)

(56) References Cited

U.S. PATENT DOCUMENTS

| | | |
|---|---|---|
| 8,429,179 B1 | 4/2013 | Mirhaji |
| 9,734,289 B2 | 8/2017 | Pecora |
| 2003/0061201 A1* | 3/2003 | Grefenstette ............ G06F 16/38 |
| 2005/0108001 A1* | 5/2005 | Aarskog ............... G06F 17/271 |
| | | 704/10 |
| 2006/0020466 A1 | 1/2006 | Cousineau et al. |
| 2006/0104511 A1 | 5/2006 | Guo et al. |
| 2009/0012842 A1 | 1/2009 | Srinivasan et al. |
| 2010/0174732 A1 | 7/2010 | Levy et al. |
| 2010/0293451 A1* | 11/2010 | Carus ..................... G06N 20/00 |
| | | 715/230 |
| 2018/0046764 A1* | 2/2018 | Katwala .............. G06F 17/2785 |

\* cited by examiner

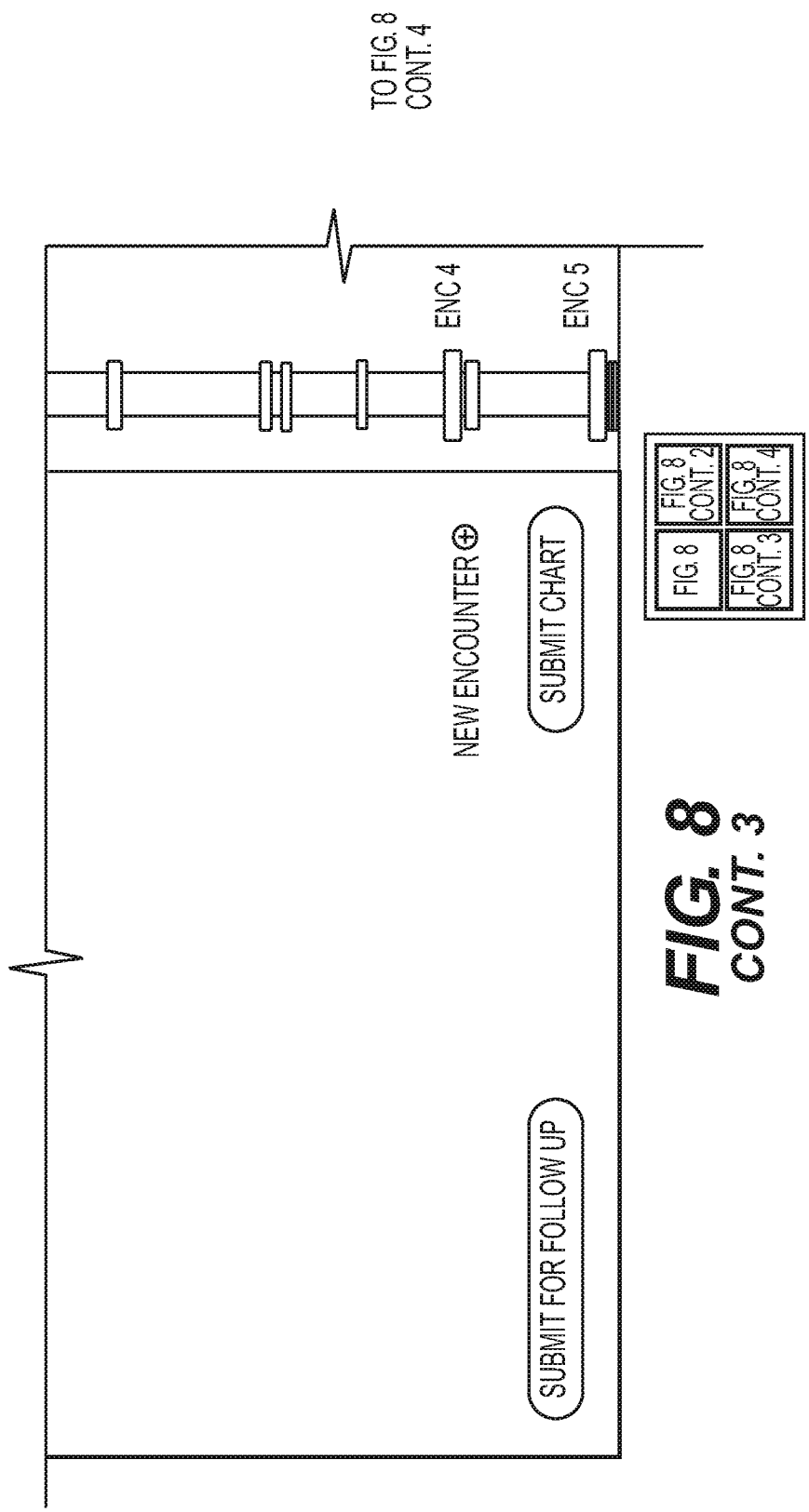

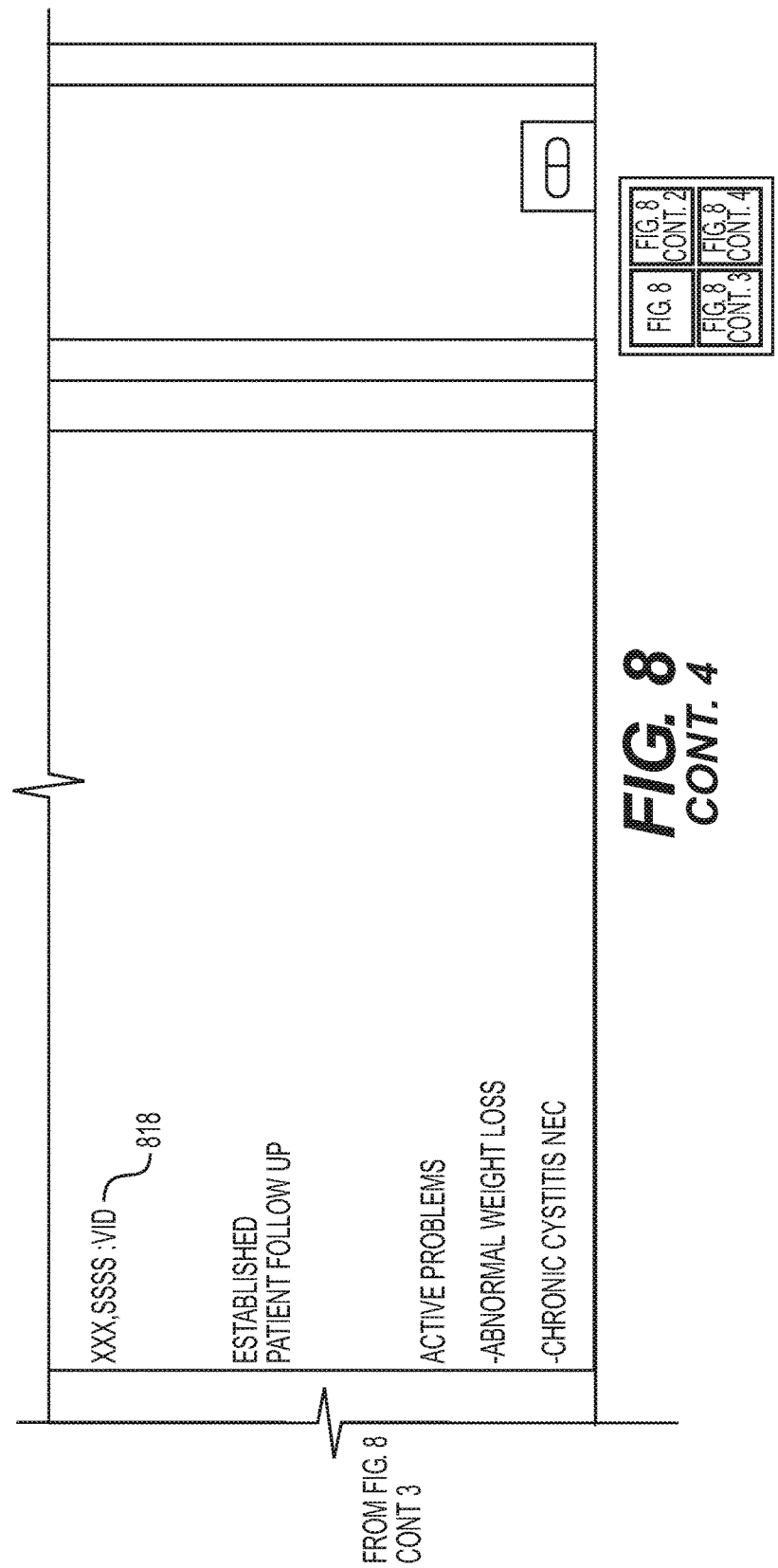

FIG. 9

NO HTML STYLING ANNOTATIONS

BROWN, KELLY (04/01/1947) KELBRO
PATIENT RECORD FOR BROWN, KELLY
CREATED ON JUNE 29, 2016
PATIENT:
BROWN
KELLY
MAIN STREET
HUNTINGDON VALLEY, PA
MRN:
KELBRO
BIRTHDATE:
0
01
947
7
SEX:
FEMALE
EMERGENCY CONTACT:

900

HTML STYLING ANNOTATIONS OVER PLAIN TEXT

BROWN, KELLY (04/01/1947) #KELBRO

PATIENT RECORD FOR BROWN, KELLY ←— CENTERED ALIGNMENT
CREATED ON: JUNE 29, 2016

| PATIENT: | BROWN, KELLY<br>MAIN STREET<br>HUNTINGDON VALLEY, PA | MRN: | KELBRO |
|---|---|---|---|
| BIRTHDATE: | 04/01/1947 | SEX: | FEMALE |
| EMERGENCY CONTACT: | | | |

BROWN, KELLY (04/01/1947) KELBRO

ENCOUNTERS LIST ←— BOLD TEXT

| SERVICE DATE | OPENED | PROVIDER | SIGNED BY | COSIGNED BY | DIAGNOSIS |
|---|---|---|---|---|---|
| 10/12/2015 | 10/12/2015 | BANK, SEAN | BANK, SEAN | | |
| 06/15/2015 | 06/15/2015 | BANK, SEAN | BANK, SEAN | | |
| 02/23/2015 | 02/23/2015 | BANK, SEAN | BANK, SEAN | | |

⟵ FORMATTED TABLES

PROBLEMS

| ICD9 CODE | PROBLEM | ONSET DATE | RESOLUTION DATE | TYPE | STATUS |
|---|---|---|---|---|---|
| NO PROBLEM LIST FOUND | | | | | |

BROWN, KELLY (04/01/1947) #KELBRO

*FIG. 9 (CONT.)*

DOCUMENT PROCESSING

CROSS-REFERENCE TO RELATED APPLICATIONS

This application is a continuation-in-part of U.S. Non-provisional application Ser. No. 15/879,031 filed on Jan. 24, 2018, which in turn claims the benefit of U.S. provisional application Ser. No. 62/527,441, filed on Jun. 30, 2017, the disclosures of these applications are expressly incorporated herein by reference in their entireties.

BACKGROUND

Forms or documents of various types are widely used for collecting information for various purposes. Medical, commercial, educational and governmental organizations use documents of various formats for collecting information and for record keeping purposes. The advent of computers and communication networks resulted in the documents being moved online so that people no longer have to fill out forms on paper. In addition, digitized records, including electronic and scanned copies of paper documents, are now generated using computers. These electronic documents are shared over the communication networks thereby saving time and resources that may be otherwise required for generating and exchanging paper documents.

These documents may contain data in structured and unstructured formats. A structured document can have embedded code which enables arranging the information in a specified format. Unstructured documents include free form arrangements, wherein the structure, style and content of information in the original documents may not be preserved. It is not uncommon for record-keeping entities to create and store large unstructured electronic documents that may include content from multiple sources.

Often, various enterprise systems wish to utilize information from electronic documents to perform operations. It is relatively easy to programmatically extract information from structured documents that have a well-defined or organized data model, such as extracting data from fields in a form where the fields are at a known location in the form (e.g., data in a tabular arrangement). However, when the electronic documents include large unstructured documents, such as the type of unstructured document discussed above, it is technically difficult to extract information that may be needed to perform operations of enterprise systems or other types of systems. This type of unstructured document often does not have a well-defined data model, making it difficult to reliably programmatically parse and extract the needed information from the document.

BRIEF DESCRIPTION OF DRAWINGS

Features of the present disclosure are illustrated by way of examples shown in the following figures. In the following figures, like numerals indicate like elements, in which:

FIGS. 8-10 show graphical user interfaces (GUIs) of the document processing system in accordance with examples described herein.

DETAILED DESCRIPTION

Figure 1:
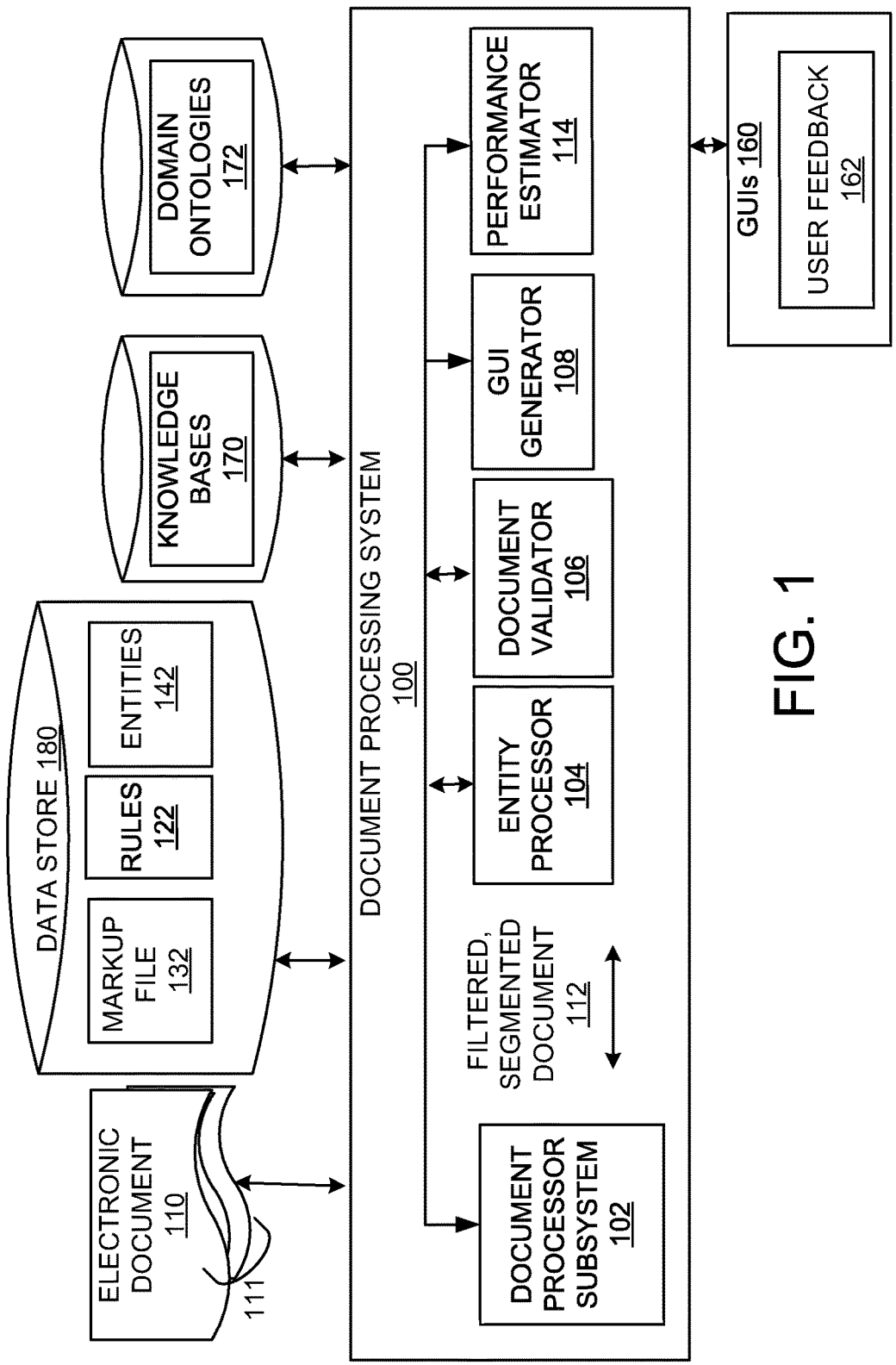
FIG. 1 is a block diagram that shows a document processing system in accordance with examples described herein.

For simplicity and illustrative purposes, the present disclosure is described by referring mainly to examples thereof. In the following description, numerous specific details are set forth to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a document processing system is described which processes electronic documents such as but not limited to, structured and unstructured documents which include one or more component documents, to extract desired information and display the information in a user-editable format styled according to the component documents from which the information was initially extracted. A document processed by the system may include a structured document, an unstructured document and/or multiple component documents combined into a single electronic document. The multiple component documents that form the electronic document may include unstructured documents, structured documents, or a combination of unstructured and structured documents, where the structured documents may have a defined data model. The multiple component documents may be obtained from multiple sources and/or may have different formats. The different formats may include, but are not limited to, non-editable image formats such as a .pdf, .jpeg, .png, etc., or formats for other types of documents. An unstructured document may not have a defined data model, making it difficult to programmatically parse and extract the desired information from the document.

The document processing system may include a document processor subsystem that accesses an electronic document, which may include a single electronic document comprised of component documents, to generate a filtered, segmented document including the information from the electronic document. According to an example, the document processing system may receive documents, which may include structured and/or unstructured documents such as described above, to be processed from data storage or over a communication network. Optical character recognition may be employed to identify textual and styling features of textual data in a received electronic document. Markup tags associated with the styling details such as, but not limited to, font, style, size, color and the like are determined. In addition, if the electronic document includes data presentation structures, such as lists or tables, then markup tags associated with such data presentation structures are also extracted. The markup tags thus determined are applied to the recognized characters to generate a markup file. The plain text data extracted from the markup file is further segmented based on boundaries, and filtered using trained classifiers to remove irrelevant pages. A filtered, segmented document which may be of multiple pages wherein each page extends between two consecutive boundaries and which includes text annotated with styling details from the processed document is produced.

An entity processor may analyze each page of the filtered, segmented document to identify and extract various entities using natural language processing (NLP) and entity recognition (ER) techniques over multiple knowledge sources. An entity can be a word or a phrase that represents predetermined subject matter. In an example, each of the entities within a page can be categorized as one of a condition entity that represents a status or condition to be verified or an evidence entity that provides support to a condition entity. The entities can be further filtered to remove irrelevant entities using domain-specific criteria, lexical rules and language rules. Knowledge bases can be queried to discover new candidate links between different types of entities. In addition, user feedback can be employed to add new links or invalidate existing links between entities.

The information extracted from the processed document can be displayed for user review via an interactive GUI which displays via annotations, the entity relationships. Extracted information can be annotated with the formatting as identified from the processed document and displayed on the interactive GUI. The interactive GUI may permit a user to edit the boundaries between the pages, establish new links or remove existing links between entities. Knowledge bases associated with the processed documents may be modified according to the user input or feedback so that subsequent analysis of entities can be based on the user input.

The document processing system can be configured not only for automatic learning and improvements via the feedback but can also facilitate performance monitoring. For example, the feedback can include positive feedback which reinforces the output of the document processing system. The feedback can also include the above-mentioned user edits to one or more of the annotations, entity relationships and boundaries. Implicit positive feedback reinforcing the output of the document processing system can be presumed if no user edits are received in response to the information displayed via the GUIs. In an example, if the output from the document processing system includes a conclusion or such as a diagnosis in case of a health-related document, the implicit positive feedback can indicate a higher accuracy of a source that provided the conclusion. The source may be the document processing system which provided the conclusion using the knowledge bases and/or the domain ontologies, or the source can be a human user who reviewed the information during the process of generation of the GUIs. Accordingly, the document processing system records higher accuracy or higher rank for the source providing the conclusion. Based on the feedback thus obtained it can be determined that either the document processing system may require further configuration changes or the user providing the conclusions needs further training. Therefore, the document processing system can be configured to collect feedback for the displayed information from the received electronic document and to automatically learn from the feedback thereby constantly improving the output with usage.

Technical improvements of the document processing system may include improving the precision of the desired information that is extracted from the documents. Also, the processed documents may include one or more of structured and unstructured documents of different formats some of which may include typed textual data while others may include handwritten text, some of the data may be presented as tables, graphs or other non-textual formats. The document processing system can analyze such heterogeneous documents of myriad formats to identify and evaluate information presented therein. Also, textual data transformations that are performed during the processing of the documents represent technical improvements as they allow a dynamic presentation of the data from non-editable image files in styles of the original documents. As a machine-based document processing methodology is used to extract information from the electronic document(s), it can aid in improving the speed and accuracy of the document review processes. The human users can review the gist or important information extracted from the documents as displayed by the GUIs rather than examining each of the component documents for sifting through the details to identify important information. Also, machines can be more accurate and faster in routine data mining procedures and hence the document processing system also improves accuracy. However, the document processing system provides for user participation at the same time via the interactive GUI which permits users to edit data or information derived from the processed documents thereby improving knowledge bases with user feedback.

FIG. 1 is a block diagram that shows a document processing system 100 in accordance with an example. The document processing system 100 receives electronic documents as image files, and processes the electronic documents to display annotated information from each electronic document. A GUI generator 108 associated with the document processing system 100 generates GUIs 160 that display the information from the unstructured documents annotated and formatted in accordance with a style in which the information was presented in the original component documents 111 that constitute an unstructured document. The GUIs 160 can be further configured to display conclusions derived from information in the unstructured document as detailed herein. The document processing system 100 thereby improves information processing systems by not only enabling display of annotated information from the unstructured documents, but also by adding functionality to examine, accurately and reliably decipher and draw conclusions from the information in the unstructured documents thereby automating a myriad tasks such as validation, routing, urgency detection and the like for the unstructured documents.

The document processing system 100 includes a document processor subsystem 102, an entity processor 104, a document validator 106, a GUI generator 108 and a performance estimator 114. An electronic document 110 provided to the document processing system 100 can be a single non-editable image file of multiple component documents 111 of various formats that include one or more (e.g., tens or thousands of) pages containing domain-specific information. Examples of the electronic documents can include without limitation, structured and unstructured documents such as, contracts, mortgage documents, claims, customer correspondence, healthcare Explanation of Benefits (EOBs), proposals, social media messages, electronic health records (EHRs), and the like. The electronic documents may be produced from a variety of sources such as scanned handwritten notes, automatically generated transcriptions of voice files and the like. The electronic document 110 can thus include various documents generated either from an optical equipment such as a scanner or data files such as comma separated value (CSV) files, spreadsheets, presentations and the like obtained from a data store or via transmission from a communication network. Images included in the electronic document 110 may have various formats such as .pdf, .png, .jpeg and the like.

The document processing system 100 can be configured to carry out various data related functions such as but not limited to extracting information from non-editable image files in the electronic document 110, presenting extracted information in an editable format on a GUI, verifying the accuracy of the information presented in the electronic document 110 and presenting alternatives to the information presented in the electronic document 110.

A document processor subsystem 102 initially processes the electronic document 110 into a file including markup such as a Hypertext Markup Language (HTML) file that preserves the structure, styling and text of the original documents in the electronic document 110. The markup file 132 can also include tags that preserve the formatting details of the text in the electronic document 110. Plain text along with formatting and styling information is extracted from the markup file 132. The plain text data can be further processed into multiple pages based on different criteria.

In an example, the plain text extracted from the markup file 132 can be split or automatically segmented into sections based on dates in the electronic document 110. The pages can be alternately or additionally split based on document type such as whether the document is a contract, a collection of social media communications or an EHR and the like. A data store 180 associated with the document processing system 100 stores rules 122 which can be employed in conjunction with machine learning (ML) techniques by the document processor subsystem 102 in order to split the plain text data into constituent smaller pages.

Document segmentation employs a problem-decomposition approach to break the electronic document 110 into smaller, easier-to-resolve pages that provide a better or a more tightly focused context for extracting pertinent information from the electronic document 110. In an example, the pertinent information may include names of entities, and the extraction of this type of information is referred to as entity extraction. Firstly, better textual content enables identifying, disambiguating and linking entities, wherein the semantics around an entity are different depending on the document type.

For example, in the case of an EHR, the entity context within a doctor's notes may be different when compared to the context associated with the entity in a lab report. Secondly, segmenting a plain text document obtained from the electronic document 110 by identifying a document type limits the scopes of relationships that can be established between various types of entities to the document contexts where the entities occur as opposed to disambiguating the context of the entire electronic document 110. Furthermore, the document processor subsystem 102 further edits the electronic document 110 to remove irrelevant portions. Thus, the document processor subsystem 102 receives as input, the electronic document 110 including multiple pages, extracts and provides filtered, segmented document 112. The filtered, segmented document 112 preserves the original structure and text formatting from the electronic document 110 while the irrelevant pages can be deleted.

The document processing system 100 further includes an entity processor 104 which receives the filtered, segmented document 112 from the document processor subsystem 102 and automatically identifies various types of entities and determines the relationships between the various types of entities. Entities 142 may be keywords associated with occurrences of certain conditions and supporting evidences based on a category of the electronic document 110. For example, the entities encountered in a contract may be different from the entities encountered in an electronic health record (EHR) or entities in a collection of social media messages.

One or more of the entities 142 may be classified into various entity types which may include at least condition entities and evidence entities. Condition entities can be those entities associated with a condition that is being verified, validated or approved by the document processing system 100. Each condition entity can be linked to one or more evidence entities. Evidence entities are those entities that support verification or fulfilment of the condition entities. The condition entities and the evidence entities extracted from the electronic document 110 also depend on the category of the electronic document 110. For example, if the current task relates to processing a health-related condition, condition entities can be those entities associated with the various health conditions experienced by the body which can include diseases, injuries, infections and the like. Evidence entities can include one or more of medications, symptoms, treatments, tests, health or body metrics and numerical ranges or values associated therewith. Based on the strength of the associations or links between a condition entity and the related evidence entities, the document processing system 100 can be configured to determine accuracy of a conclusion in the electronic document 110 regarding a particular condition. The entity processor 104 is configured to score and rank the evidence entities for each condition entity in order to estimate the extent of correlation which further leads to establishing the existence of that particular condition. The document processing system 100 is therefore configured to confirm, contradict or propose alternate conditions for the conditions proposed in the electronic document 110.

The document processing system 100 may further include a document validator 106 which conducts validation checks to ensure accuracy and quality of the output. The validation checks verify the filtered, segmented document 112 for completeness, correctness and meaningfulness. Completeness check requires a verification that the necessary fields within the forms in the electronic document 110 are filled out. In case any required fields are vacant, the document processing system 100 may flag the fields for being filled out by a human operator. In the correctness check, outcomes are recommended based on manual feedback and prompt a user to change fields if the fields are not aligned with the outcomes. For example, if an authorization is to be provided for a matter in the electronic document 110, but the policy to meet the necessary criteria are not filled out, a human reviewer of the electronic document 110 within the document processing system 100 may be prompted to validate the policy before the electronic document 110 is further processed towards the approval. Meaningfulness requires that the electronic document 110 to have sufficient support for all the recommendations included therein. For example, if a human reviewer of the electronic document 110, which may be an EHR, wants to add a diagnosis code for Risk Adjustment and does not provide necessary support, the reviewer will be prompted to add support before continuing. A message, for example, "E11.6—Diabetes with complications must have sufficient clinical support to be a confirmed code" may be displayed during a validation check.

A GUI generator 108 enables generating a GUIs 160 that displays the information and links extracted by the document processing system 100. The GUIs 160 produces visualizations of the extracted entities and the entity relationships as annotations over plain text of the electronic document 110 along with the styling markup extracted from the markup file 132. The styling information such as headings, bold or italicized text, underlines, font colors and the like is usually lost after OCR to plain text extraction, but saving this information as separate mark-up provides a flexible way to display the original styling information on top of the unstructured document text in the GUIs 160.

Furthermore, treating the annotations and extracted text separately in the GUIs 160 allows for continuous learning wherein user feedback 162 for the document processing system 100 can be captured from user interactions with the GUIs 160. The document processing system 100 is therefore configured with a feedback component that enables continuous learning and improvement in the functioning via receiving and implementing the user feedback 162. User interactions such as validating or invalidating the extracted entities and entity relations are modeled and captured in knowledge bases 170 which can include information regarding relationships and associations based on confidence levels. Knowledge bases 170 can be used to direct future choices made by the document processing system 100. The knowledge bases 170 may be stored on the data store 180 or remote data stores. The visualization provided by the GUIs 160 also facilitates capturing the user interactions providing feedback thereby providing continuous learning to the document processing system 100.

The feedback component described above allows determining performances of one or more of the human users and the document processing system 100. A performance estimator 114 is included in the document processing system 100 to determine the performances based on accuracy of the predictions or conclusions provided by the human users and/or the document processing system 100. For example, where one of the GUIs 160 outputs a conclusion, such as a diagnosis, the user feedback 162 confirming or changing the diagnosis can enable the performance estimator 114 to determine accuracy of the inputs that led to the conclusion. The user feedback 162 confirming the conclusion enables the performance estimator 114 to determine that the source of the conclusion, such as another human user and/or the document processing system 100, is accurate. Conversely, the user feedback 162 changing the conclusion or diagnosis allows the performance estimator 114 to indicate that one or more of the document processing system 100 and the human user(s) that provided the input to the conclusion are inaccurate. Further configuration changes including further training for the entity processor 104 may be suggested. Similarly, further training regarding the domain may be suggested for the human user. The performance estimator 114 may also be configured to record and compare performance between different human users regarding the accuracy of their inputs towards conclusions. The performance estimator 114 can thus allow the human users and the document processing system 100 to be ranked based on respective accuracies of the conclusions.

Figure 2:
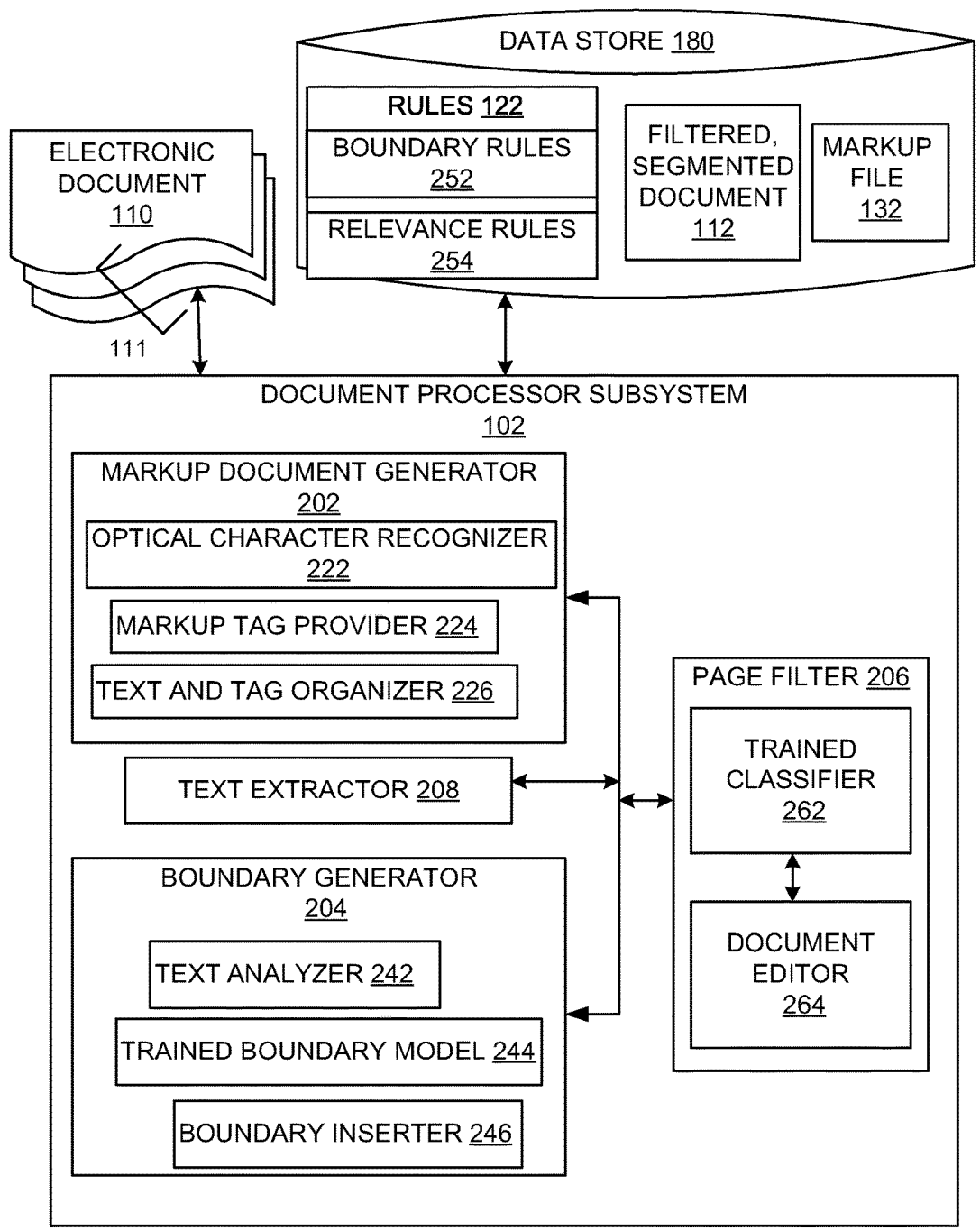
FIG. 2 is a block diagram that shows the details of a document processor in accordance with examples described herein.

FIG. 2 is a block diagram that shows the details of the document processor subsystem 102 in accordance with examples described herein. Certain example documents such as an EHR may be used throughout the description below for consistency in explaining elements of the document processing system 100. However, it can be appreciated that other documents such as contracts, social media messages, mortgage documents, proposals and the like can be similarly processed by the document processing system 100 in accordance with examples disclosed herein.

The document processor subsystem 102 includes a markup document generator 202, a boundary generator 204, a page filter 206 and a text extractor 208. The markup document generator 202 receives the electronic document 110 and generates a markup file 132 that can be further processed to extract text along with formatting and structure metadata from the component documents 111 that constitute the electronic document 110. The various component documents 111 that make up the electronic document 110 are processed by the optical character recognizer 222 for identification of the textual data along with the formatting and document structure information or metadata.

The optical character recognizer 222 can include trained artificial intelligence (AI) elements such as neural networks that are capable of recognizing characters with a high degree of accuracy for most of the commonly used fonts and can support various image formats. Furthermore, the AI elements can also be trained to not only identify particular textual characters but also to reproduce formatted output that can resemble the original document in terms formatting, structure, tables and other non-textual elements.

In an example, document processor subsystem 102 can be programmed to identify information based on the forms that contain the information. The optical character recognizer 222 may be configured to detect the type of form used and extract information using one or more of keywords, formats and form layouts. For example, the status of a checkbox on a page may indicate a state of an entity between two possible states. The optical character recognizer 222 can pre-process the images for de-skewing etc., and implement techniques such as but not limited to, pattern matching, feature extraction and comparison of the textual characters with stored glyphs using algorithms such as KNN (k nearest neighbor) for choosing a nearest match for each extracted character feature.

The textual data as identified by the optical character recognizer 222 along with the corresponding font, formatting and other non-textual metadata can be provided to the markup tag provider 224. The markup tag provider 224 can identify the markup tags to be applied to particular textual data in order to reproduce markup version in accordance with the original component documents 111 included in the electronic document 110. In an example, the markup tags can include HTML tags. Effects on textual data such as bold, underline, italicize, font properties such as size, color, type, textual data organization such as line and paragraph breaks, data presentation structures such as lists, tables, and the like can be implemented using the tags identified by the markup tag provider 224. A text and tag organizer 226 applies the tags obtained by the markup tag provider 224 to the textual data identified by the optical character recognizer 222 to produce the markup file 132.

The markup file 132 can be processed by a text extractor 208 to obtain the textual and formatting information. Pattern matching, NLP and the like can be employed by the text extractor 208 to extract the plain text data of the markup file 132. The formatting metadata is extracted by obtaining the formatting tags from the markup file 132. The plain text data and the formatting tags can be stored separately in accordance with an example. The output from the text extractor 208 therefore includes a single continuous page of plain text data and a collection of markup tags that represent the formatting metadata representative of formatting styles in the component documents 111 that constitute the electronic document 110.

The boundary generator 204 configured for automatic document segmentation processes the single continuous sheet of plain text data so that the plain text data is segmented into sections based on various factors. A text analyzer 242 analyzes the text in the markup file 132 to calculate features for pages on page-by-page basis. Feature set can be flexible and may be domain specific. The feature set can include lexical features such as number of lines, words, nouns, verbs etc. on the page, language features such as but not limited to percentage of words in domain language or the language of the electronic document 110 such as English, number of languages detected in the page and the like and entity features or such as number of domain-specific terms like names, dates on the pages and the like.

A boundary model 244 can be trained via ML techniques to predict whether each section in consecutive order within the plain text data represents a document boundary or not based on certain boundary rules 252. In an example, the trained boundary model 244 can be trained to identify particular text data types such as dates in the plain text data so that different dates can aid in identifying different component documents 111 of the electronic document 110 that correspond to different pages of the markup file 132. The dates may be identified based on the placement of the date on the chart. For example, a date within the first two lines of the section is often the "printed" date of the chart.

In an example, keywords appearing in proximity to the date can be used to identify the dates. If the unstructured document pertains to an EHR, the dates near a word with "Lab" or "Ordered by" would be lab report where "Progress notes" may be an encounter/consultation date. Furthermore, medical entities such as diseases, medications, symptoms and tests near the portion of the date can be further incorporated into the boundary rules 252 for identifying dates in the plain text data. The trained boundary model 244 may be additionally trained to categorize sections of the plain text data based on the initial document of the electronic document 110 that the section may have been generated from.

Referring again to the EHR example, various sections of the plain text data may be identified as particular document type such as lab reports, prescriptions, orders and the like based on respective constituent documents of the electronic document 110 that the sections correspond to. In an example, the boundary inserter 246 can insert a page break between sections within the plain text data. It can be appreciated that the segmentation or insertion of page breaks into the plain text data can correspond to pages of the electronic document 110 or the markup file 132 in some examples.

In other examples, the segmentation of the plain text data into sections need not necessarily conform to the pages of the markup file 132 but may rather be governed by the boundary rules 252 which can impose one or more grouping constraints. For example, the boundary rules 252 may necessitate setting date-specific boundaries so that various types of documents generated on a single day may be grouped together. In another example, the plain text data may be further segmented based on date and document type specific boundaries.

The page filter 206 filters out or deletes pages from the component documents 111 of the electronic document 110 that are irrelevant for further data gathering and processing procedures. For example, page filter 206 can employ a relevance threshold to determine which of the component documents 111 are relevant or are irrelevant. For example, the page filter 206 can include an ML model including a trained classifier 262 which employs relevance rules 254 for determining if a page is relevant. Here, the relevance rules 254 are used to implement the relevance threshold.

In an example, the trained classifier 262 can be a regression classifier. The page filter 206 determines the probability that a page is garbage by using a trained classifier 262 such as a logistic regression classifier. The relevance rules 254 can include lexical rules which determine the number of lines, tokens, punctuations, words, lexical types (nouns, adjectives, verbs) and character, language rules that determine the percentage of English words, languages detected in the markup file 132, percentage of English stop words and the like. The relevant rules 254 may also be based on domain-specific terms and the like.

The page filter 206 outputs a relevance decision and an associated prediction score for each page. In an example, the classifier 262 can be trained with examples of relevant and non-relevant pages from various EHRs. Non-relevant pages are thus removed from further processing by a document editor 264. For example, a cover page for a medical record, such as a lab report, may be filtered out as irrelevant by the page filter 206. A filtered version of the plain text data that is segmented into sections based on the boundary rules 252 is produced as the filtered, segmented document 112 by the document processor subsystem 102. It can be appreciated that the procedures to segment the plain text data as executed by the boundary generator 204 and filtering out irrelevant pages which is executed by the page filter 206 may occur serially one after the other or simultaneously in accordance with examples disclosed herein.

If the electronic document 110 is a structured document it can be appreciated that certain procedures outlined above may not be needed. For example, if the structured document includes markup, then the structured document may not require processing by the markup document generator 202. The structured document can be processed directly by the text extractor 208, the boundary generator 204 and the page filter 206 for displaying annotated information via the GUIs 160. In another case, wherein certain component documents of the electronic document 110 can be structured while the other component documents may be unstructured, a single image file as outlined above can be generated and further processed by the markup document generator 202, the text extractor 208, the boundary generator 204 and the page filter 206 as described herein.

Figure 3:
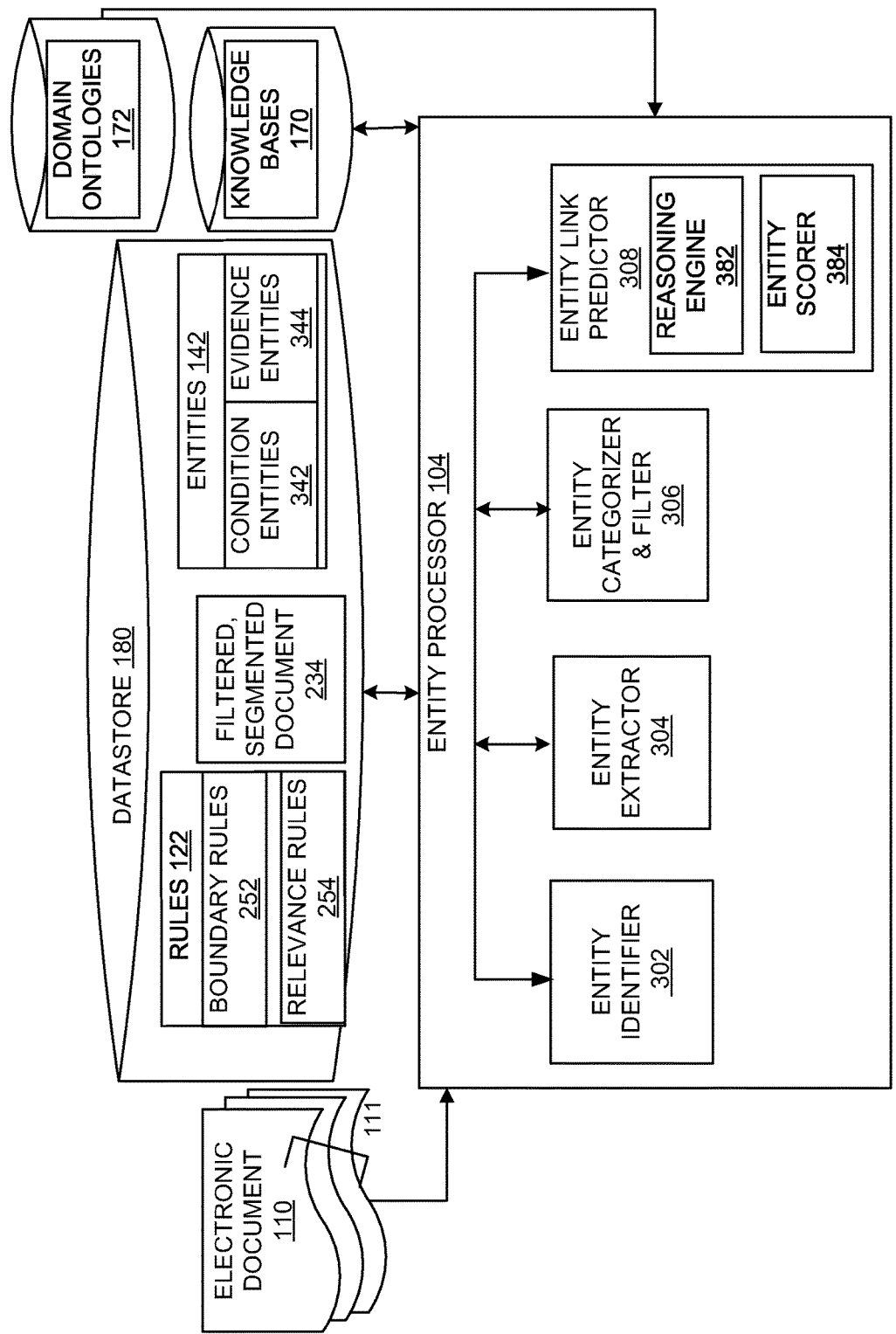
FIG. 3 shows a block diagram of an entity processor in accordance with examples disclosed herein.

FIG. 3 shows a block diagram of the entity processor 104 in accordance with examples disclosed herein. The entity processor 104 processes the filtered, segmented document 112 to identify various types of entities. The document processing system 100 is configured to identify two entity types—condition entities 342 and evidence entities 344. The various types of entities and their relationships can be expressed as annotations over document text that may be displayed within the GUIs 160.

An entity identifier 302 identifies the entities 142 within the filtered, segmented document 112 using NLP in conjunction with knowledge bases 170 and domain-specific ontologies. For example, if a healthcare EOB or an EHR is being processed, domain ontologies 172 such as medical ontologies including but not limited to clinical Text Analysis and Knowledge Extraction System (cTakes) and Unified Medical Language System (UMLS) may be used. The entity identifier 302 can employ programs such as Meta Map that map text from the filtered, segmented document 112 to the UMLS Metathesaurus.

In an example, keywords occurring in the text of the filtered, segmented document 112 can be identified via comparing the textual data of the filtered, segmented document 112 with the proprietary domain-specific libraries. For example, clinical libraries with over 500 million combinations across conditions, drugs, lab tests may be used to evaluate and interpret the meaning of clinical information in an EHR.

An entity extractor 304 parses the entities 142 recognized by the entity identifier 302. Various domain-specific keywords, nouns, dates and the like may be recognized as entities by the entity identifier 302. An entity categorizer and filter 306 categorizes the entities based on their semantic types. For example, semantic types for an EHR may include clinical diseases/conditions and evidences such as medications, treatments, symptoms, lab results, tests ordered and assessments. The categorization of an entity can be executed by employing domain ontologies 172 such as the UMLS.

The entities can be categorized into condition entities 342 and evidence entities 344. Condition entities 342 pertain to conditions. For example, the condition entities 342 may pertain to conditions experienced by a patient. Examples of the condition entities 342 can include but are not limited to conditions, symptoms or diseases experienced by the patient. The condition entities 342 are identified from the filtered, segmented document 112. Evidence entities 344 can include evidences that support conclusions of the conditions. Evidence entities 344 can be extracted from the filtered, segmented document 112.

For example, if a conclusion is that a patient is diagnosed with diabetes, the evidence entities 344 may include test results and symptoms extracted from the filtered, segmented document 112 that may support the diagnosis. The entity categorizer and filter 306 can include trained AI elements such as classifiers to categorize the entities 142 as the condition entities 342 or the evidence entities 344. Furthermore, the entity categorizer and filter 306 filters or removes the irrelevant entities.

Assessing relevance can include a domain-specific evaluation and depends on relevance indicators such as lexical label. For example, entities that are prepositions, conjunctions etc. can be removed. Very short terms which may be 1-2 characters long including irrelevant abbreviations which may not be found in the knowledge bases 170 or domain ontologies 172 and which are not expanded or clarified, can be filtered out. Entities may also be removed based on surrounding text context. For example, a condition entity preceded by a negation 'no' or 'denies' may be disregarded.

Entity link predictor 308 employs data from the knowledge bases 170 and domain ontologies 172 to identify or predict links or relationships between the condition entities 342 and the evidence entities 344. Various types of evidence entities 344 to support or deny the corresponding policies or conditions outlined in the electronic document 110 can be identified based on domain-specific libraries, previous annotations and word embeddings.

In an example, knowledge graphs can be used to created graphical inferences from the knowledge bases 170 to determine if there are any additional links between the two entity types. Threshold analytics may be applied to the links between the condition entities 342 and the evidence entities 344 so that weak links that signify negligible correlations may be discarded. A reasoning engine 382 is included in the entity link predictor 308 for employing known links between the condition entities 342 and the evidence entities 344 to generalize and learn new relations. The reasoning engine 382 can be configured to query knowledge bases 170 to discover new candidate link/relations between the condition entities 342 and the evidence entities 344 using reasoning or inference over knowledge graphs that model domain knowledge and user interactions with the document processing system 100. Thus, the entity link predictor 308 is configured for continuously discovering new links from the unstructured documents processed by the document processing system 100.

In an example, the entity link predictor 308 can include an entity scorer 384 that assigns each of the condition entities 342 a score based on features/properties or evidence entities related to the condition entity and rank the condition entities 342 to select a most representative subset of conditions. One of the features used to rank the condition entities 342 can include a context within a document. For example, the document may be a doctor's notes produced during a patient's doctor visit. The document can be a clinical code near the entity occurrence, or there may be other condition entities surrounding a condition entity's occurrence in a document and the like.

In an example, the quality of evidence entities linked to a particular condition such as the number of evidence entities supporting the condition entity, the percentage of evidence entities extracted from the electronic document 110 of the set of evidence entities that support the condition entity, the proximity of the linked evidence entity to the condition entity in the electronic document 110 document and the like. The entity scorer 384 may be further configured to score and rank the evidence entities for each condition entity to select a most representative subset of evidence entities for each condition entity. Condition entities 342 from the constituent documents of the electronic document 110 can thus be extracted, scored, ranked and linked to extracted evidence entities. The GUIs 160 is configured to display the entities and entity relations as annotations over the text while displaying the filtered, segmented document 112.

In an example, the entity processor 104 can be configured to execute additional tasks such as but not limited to urgency detection, policy recommendations and the like. The condition entities 342 and the evidence entities 344 may have particular properties which can be used for urgency detection. When the document processing system 100 is configured for urgency detection, the condition entities 342 and the evidence entities 344 can be processed for identifying keywords such as 'as soon as possible' which indicate urgency appearing on the component documents 111 within the electronic document 110. Particular dates appearing in the documents such as statutory deadlines, dates associated with actionable items and the like may be used to determine the urgency associated with a task to be completed.

In another example wherein an EHR is being processed, particular procedure codes may be automatically associated with urgent processing. Particular codes that signal urgency may be associated with diseases, medication, symptoms and tests and other entities. Explicit instructions may also be identified from the electronic document 110 so that when a note that "This is urgent and needed immediately" is processed, the words 'urgent' and 'immediately' can be identified which can cause the electronic document 110 containing the note to be brought to the beginning of a processing queue.

Figure 4:
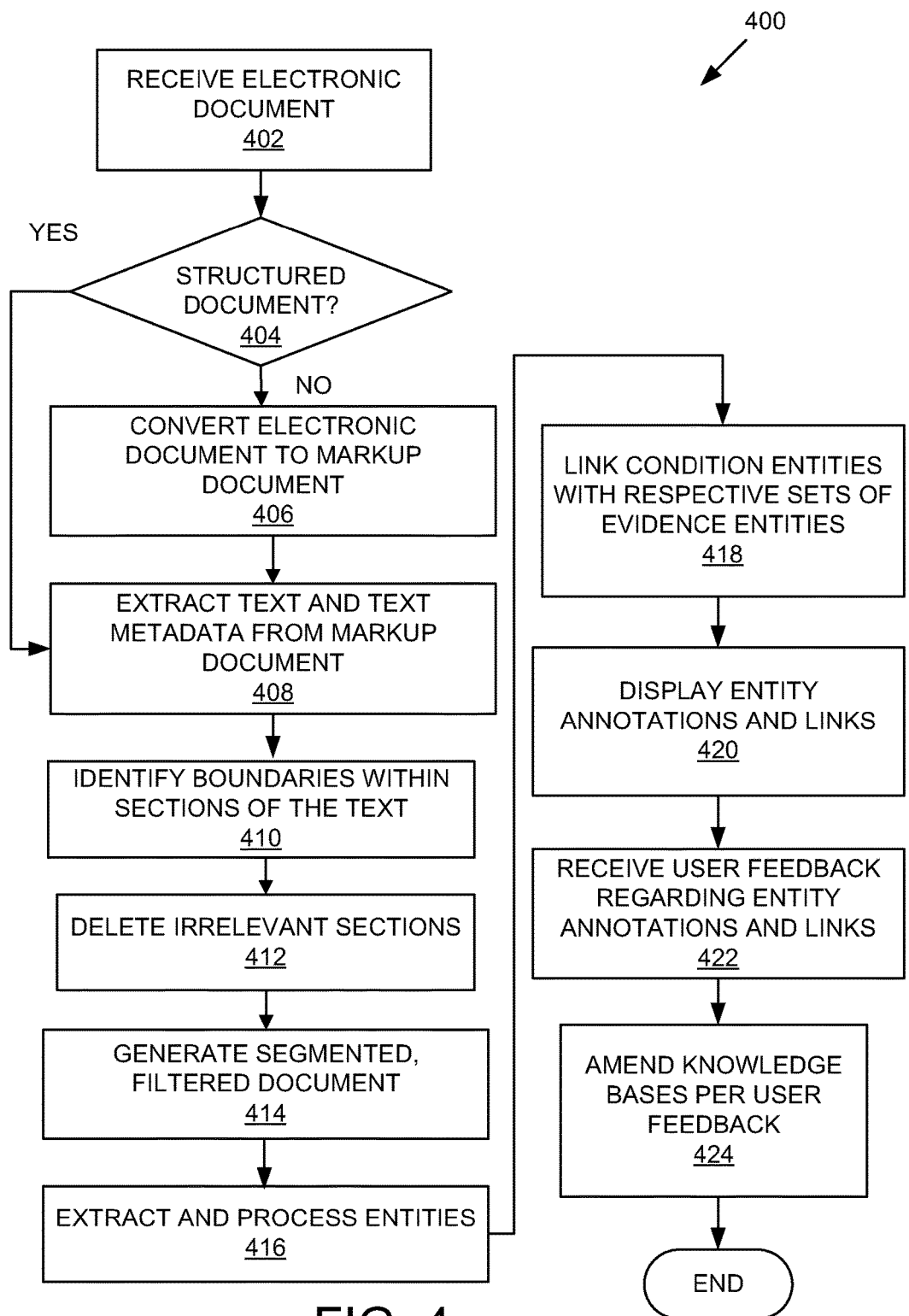
FIG. 4 is a flowchart that details a method of deriving entity relationships in accordance with examples disclosed herein.

FIG. 4 is a flowchart of a method of displaying entity relationships derived from the electronic document 110 and editing the entity relationships based on user feedback. The method begins at 402 wherein the electronic document 110 is received. The electronic document 110 can include multiple component documents 111 having various formats with different data and document structures. It is determined at 404 whether the electronic document 110 is a structured document that includes formatting or other structural data pertaining to the information in the electronic document 110. In an example, the electronic document 110 can be considered to be a structured document if all the component documents 111 are also structured documents so that the step of conversion to the markup file can be omitted. However, if the component documents 111 include at least one unstructured document, then the electronic document 110 can be considered as an unstructured document. If it is determined at 404 that the electronic document 110 is an unstructured document, the received electronic document 110 is converted to a markup file 132, for example, an HTML document at 406. The markup file 132 includes the textual data from the various component documents 111 of the electronic document 110.

If it is determined at 404 that the electronic document is a structured document, then the method moves to directly to block 408 wherein the textual data from the electronic document 110 can be styled and formatted within the markup file 132 so that the markup file 132 preserves the original styling, presentation and document structure information from the electronic document 110. The text is extracted from the markup file 132 in order to obtain plain text version of the markup file 132 at 408. In addition, the metadata of the markup file 132 is also obtained at 408. The metadata can include the styling and formatting information of the text, data presentation structures within the markup file 132 and the structure information of the component documents 111 from the electronic document 110 as represented in the markup file 132.

At 410, the boundaries between various sections of the text in the plain text are identified based on specific boundary rules 252. In an example, the boundary rules 252 may identify boundaries within the plain text data that are identical to the boundaries within the corresponding component documents 111 in the electronic document 110 from which the plain text is extracted. The boundary rules 252 may cause groupings of the information extracted from the various documents of the electronic document 110 based on various criteria. The criteria may be domain-specific so that different boundary rules 252 may be selected for different document categories.

By the way of illustration and not limitation, if the electronic document 110 pertains to an EHR, the boundary rules 252 may identify the boundaries based on criteria such as encounter dates so that all the documents generated within the various encounters or consultations between the patient associated with the EHR and the various providers on a single day/week/month are grouped together between two boundaries.

Similarly, in another example, the boundary rules 252 may identify the boundaries based on domain-specific criteria such as a condition/disease so that all the documents generated within the various encounters of 4 the patient associated with the EHR and the various providers for a single condition on different days/weeks/months are grouped together between two boundaries. Generally, the boundary rules 252 may also set the boundaries based on user input that may be provided explicitly via the GUIs 160 or implicitly based on the type of information being sought for a particular procedure being executed the document processing system 100. The boundary rules 252 may further include lexical rules based on but not limited to, the number of lines, tokens, punctuations, words, lexical types such as but not limited to nouns, adjectives, verbs and characters.

The boundary rules 252 may further identify boundaries based on language rules such as percentage of English words, languages detected in a page, percentage of stop words and the like. Furthermore, domain-specific keywords including named entities such as names and dates appearing on the pages may also be used for identifying the boundaries within the extracted plain text. In an example, page breaks may be included at the identified boundaries so that the information is shown under different pages.

On identifying the boundaries, the relevance rules 254 including at least rules for analyzing contexts surrounding the entities are used to determine sections which contain information that is relevant to a display to be generated on the GUIs 160 so that sections which contain irrelevant information can be deleted at 412. The page filter 206 uses relevance rules 254 to determine the probability that a page within the HTML is 'garbage' or irrelevant by excluding entities from the pages. Moreover, lexical, language and clinical elements may also be factored into consideration while determining the probability of page relevance.

In an example, a cover page for a medical record may be filtered out or deleted at step 412 using the relevance rules 254. Accordingly, a segmented and filtered document 234 including segmented and filtered version of the plain text extracted from the markup file 132 is generated at 414. At 416, the entities within a pair of successive or consecutive boundaries in the segmented, filtered document 234 are extracted and processed.

Techniques such as text matching and named entity extraction may be used in conjunction with the domain ontologies 172 and knowledge bases 170 for extracting the entities at 416. The entities can be processed at 416 for identification and categorization into one of condition entities 342 and evidence entities 344 and for filtering out entities that are determined to be irrelevant. For example, entities mentioned in relation to past history may also be deleted based on the context and rules. The condition entities 342 are linked with respective sets of evidence entities within a pair of consecutive boundaries at 418.

From domain ontologies 172, the links or relationships from condition entities 342 to one or more evidence entities 344 occurring between a pair of consecutive boundaries may be obtained. The links may be identified from domain-specific data sources such as charts, tables, codes and various types of other evidences found in the electronic document 110 to support or deny the corresponding condition based on domain ontologies 172, previous annotations and embedding of words. A display of the entities with annotations and links can be generated at 420. Various visualizations of data from the electronic document 110 can thus be generated on the GUIs 160 by applying appropriate boundary rules to segment the plain text data based on user input. A user may therefore be enabled to dynamically switch between a visualization with boundaries set per dates to a visualization where boundaries are set per conditions(s).

In an example, the entities and entity relations may be expressed as annotations over the document text in the GUIs 160. The display generated at 418 can aid in determining accuracy of diagnosis presented in the electronic document 110 regarding certain conditions. If a high score is obtained by the document processing system 100 for the condition entity associated with a conclusion in the electronic document 110, then it can be determined that the conclusion is accurate. Otherwise if a different condition entity other than the highest scoring condition entity presented in the electronic document 110 is identified by the document processing system 100, then the electronic document 110 may be flagged for further investigation.

At 422, user feedback regarding entity annotations and links is obtained. In an example, users may validate or invalidate entity annotations and links. For example, a user may explicitly add links between a condition entity and one or more evidence entities. Conversely, users may delete established links between condition entities 342 and evidence entities 344. In either case, the user-provided feedback can be stored to the knowledge bases at 424 so that subsequent queries to the knowledge bases 424 receive responses that include the user edits. Further displays that are generated can be based on the explicitly provided user feedback.

In an example, the document processing system 100 may assign higher priority to associations or links created between the condition entities 342 and the evidence entities 344 from user feedback 162. The user's qualification may additionally be factored into the priorities assigned to the links. For example, higher priority may be given to a link created by a senior level coder as opposed to the link created by a more junior level or less experience coder. In addition, users may validate their feedback using reason codes. Reverting to the example of an EHR, if a test is denied in contravention to a recommendation by the document processing system 100, a reason code that corresponds to the reason the test is denied for the condition can be provided by the user denying the test.

Figure 5:
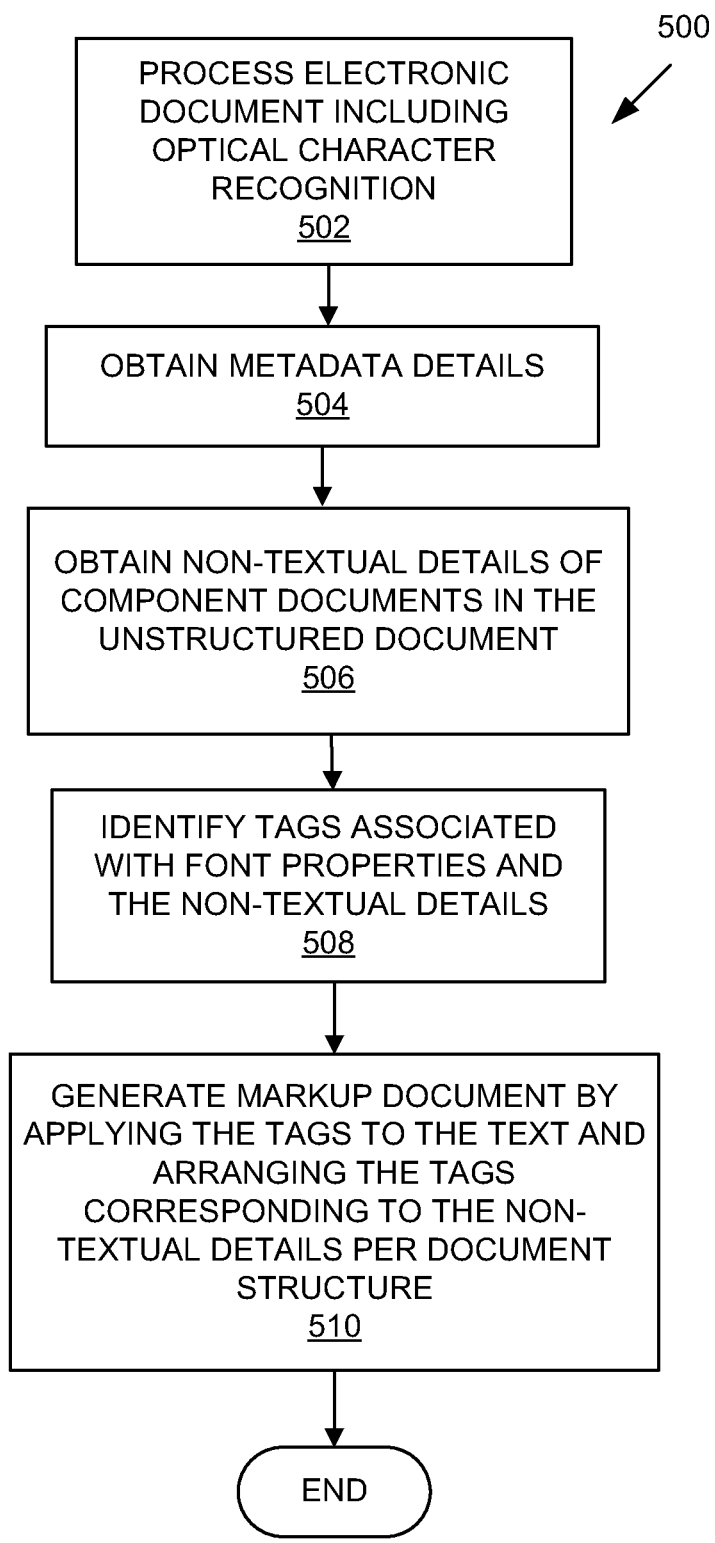
FIG. 5 shows a flowchart that details a method of converting an unstructured document into a markup document in accordance with examples described herein.

FIG. 5 shows a flowchart 500 that details a method of converting the electronic document 110 into a markup document in accordance with an example. At 502, the electronic document 110 to be converted is processed for optical character recognition to identify characters. As mentioned above, AI elements trained on labeled samples can be employed for recognizing the various characters. Other metadata details including attributes of the textual data such as font properties of the characters identified from the component documents 111 of the electronic document 110 such as font style, size, color, effects and the like are obtained at 504.

At 506, non-textual details of the documents within the electronic document 110 such as spaces, page breaks, data presentation structures and the like are also obtained. The markup tags associated with the various font properties and the non-textual details are identified at 508 using AI elements such as trained classifiers. The markup file 132 is generated at 510 by applying the identified tags to the corresponding text and by arranging the tags corresponding to the non-textual details per the structure of the component documents 111 from the electronic document 110. For example, tags corresponding to spaces, page and paragraph breaks, and data structures such as lists, tables and the like can be used in generating the markup file 132.

Figure 6:
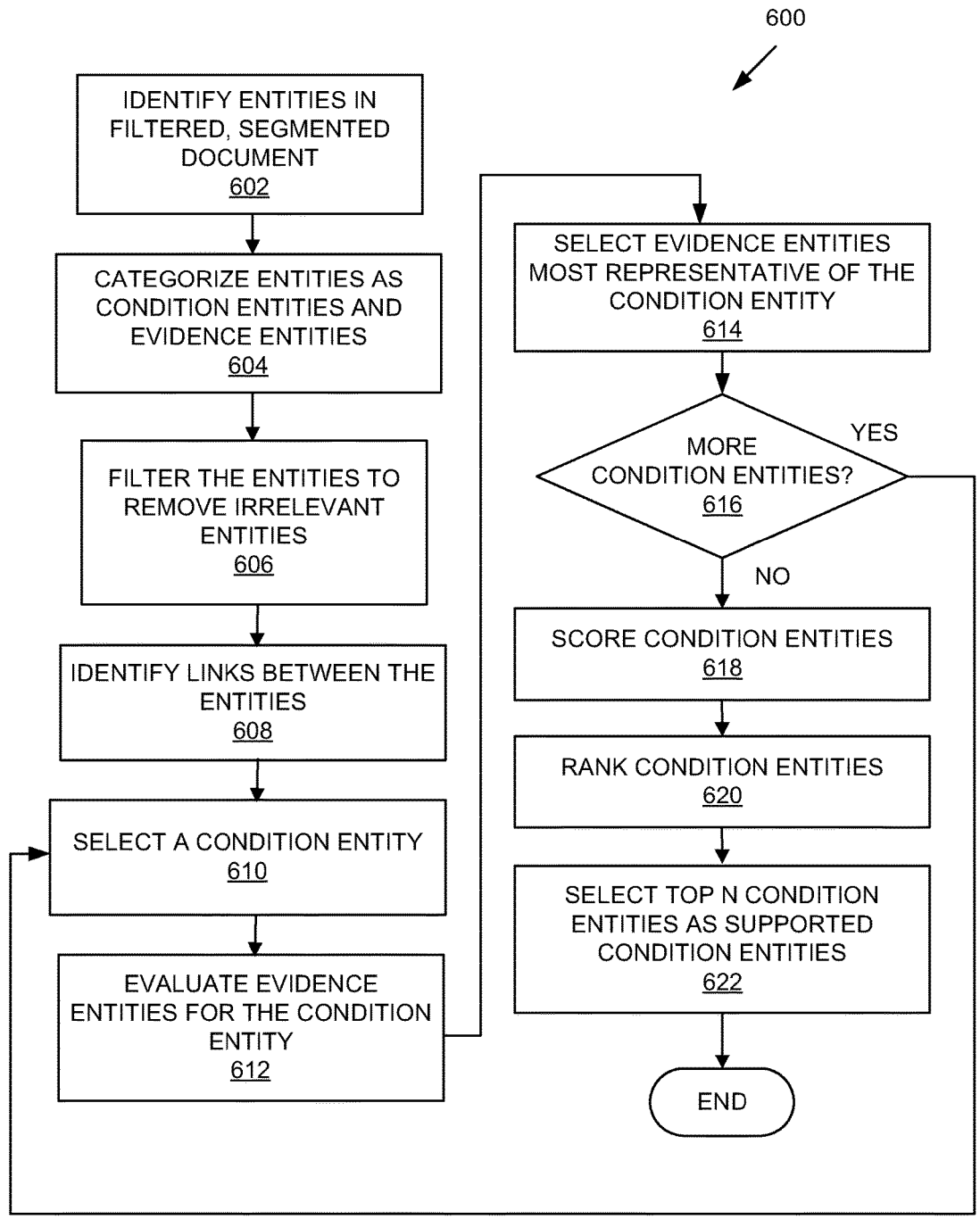
FIG. 6 is a flowchart that details a method of processing documents and extracting information from the processed documents in accordance with examples disclosed herein.

FIG. 6 is a flowchart that details a method of processing the entities in accordance with examples disclosed herein. The method begins at 602 wherein the various entities in the segmented, filtered document 112 are identified using techniques such as text matching, name entity identification and the like. The entities identified from the segmented, filtered document 234 are categorized into condition entities and evidence entities at 604. Categorization of the entities into condition entities 342 and evidence entities 344 may occur based on NLP in conjunction with domain-specific vocabularies so that particular terms or keywords in a domain may be classified as condition entities 342 and other terms or keywords may be classified as evidence entities 344 associated with particular condition entities. The entities are filtered at 606 to remove the irrelevant entities using lexical rules, language rules or identifying extraneous entities with few occurrences or entities that are mentioned briefly in the electronic document 110.

From the domain ontologies 172, links/associations/relations from condition entities 342 that signify particular conditions included in the electronic document 110 to evidence entities 344 supporting the conditions are identified at 608. The condition entities and evidence entities that occur within the same segment between two consecutive boundaries or a page may be linked at 608. Assessment of links between condition and evidence entities on the same segment simplifies the process of link identification.

At 610, a condition entity is selected and the evidence entities associated with the condition entities are evaluated at 612. The evidence entities can be evaluated via ranking and scoring using features or properties of the evidence entities such as for example, context of an evidence entity within the document. A criterion in evaluating an evidence entity may be based on a position of the occurrence of the evidence entity within the electronic document 110.

Referring to the example of an EHR, an evidence entity can be evaluated based on whether the evidence entity occurs on a doctor's note, or whether a clinical code occurs in proximity to the evidence entity, the existence of other evidence entities in proximity to the evidence entity being evaluated etc. Based on the evaluation of the evidence entities, the evidence entities that are most representative subset for the selected condition entity are selected at 614. For example, top N (N being a natural number) evidence entities with the highest scores can be selected at 614 as most indicative of the condition. At 616, it is determined if another condition entity remains for which the evidence entities need to be gathered and evaluated. If yes, the method returns to 612 to select the next condition entity and evaluate the evidence entities for the next condition entity.

If no further condition entities exist, the method proceeds to 618 wherein the condition entities are assigned a score based on respective features or properties of the condition entities. Various methodologies of statistical scoring such as averaging, obtaining a standard deviation, calculating a median of evidence entity scores for each condition entity and the like can be adopted for obtaining a score of the condition entities 342.

Condition features can include but are not limited to context within the segment between two consecutive boundaries, quality of supporting evidence entities linked to the conditions, location proximity of the linked evidence entities to the condition entities in the documents, average scores of the evidence entities supporting the condition entities and the like. The scores of the condition entities thus obtained are compared so that the condition entities are ranked at 620 and the highest scoring N condition entities (N being a natural number) are selected at 622 as condition entities supported by the evidence entities.

It can be appreciated that the processing of condition entities is shown as occurring serially only by the way of illustration and that the processors currently being used in computing devices are capable of processing a large number of condition entities in parallel to achieve higher processing speeds.

Figure 7:
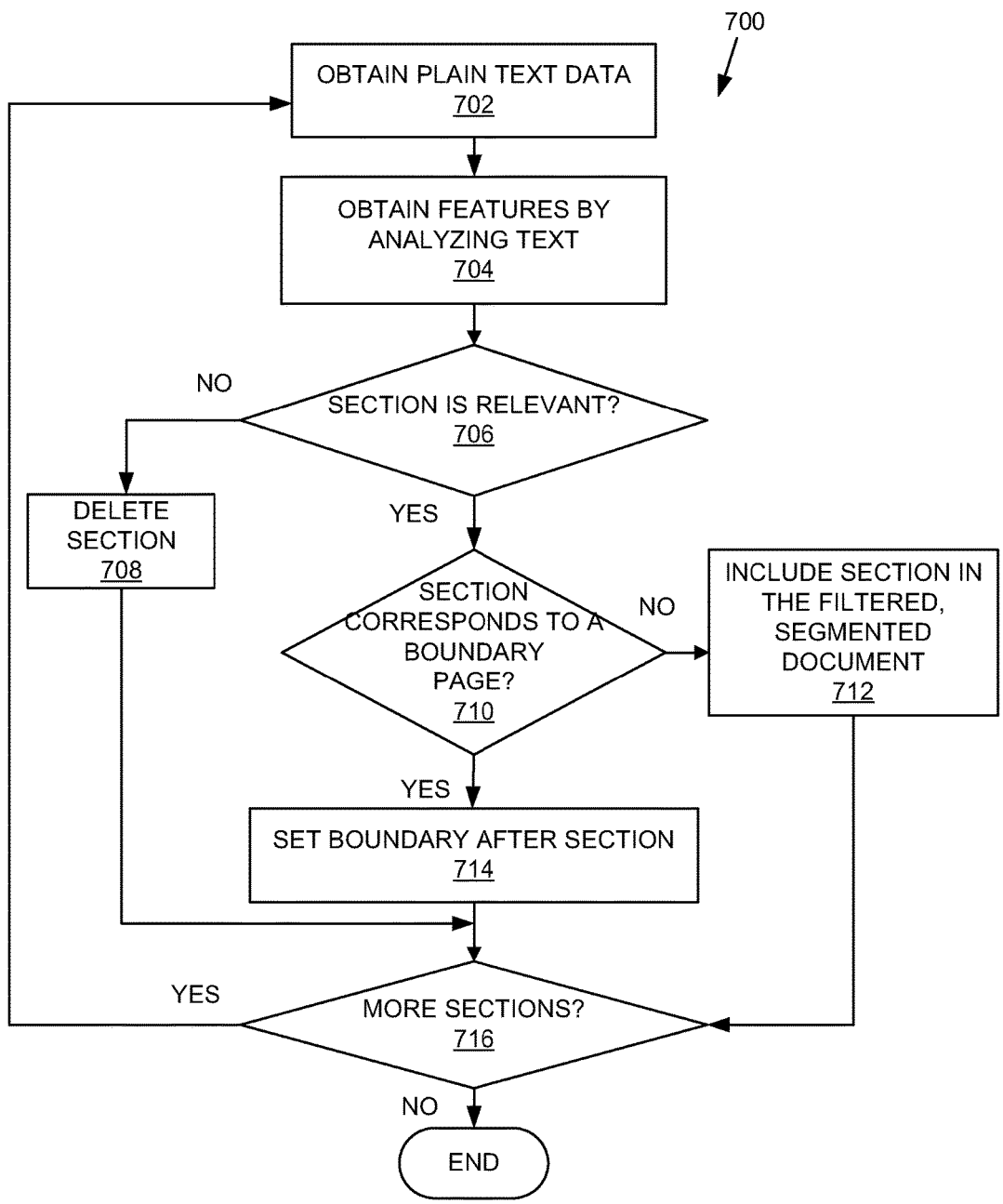
FIG. 7 shows a flowchart that details a method of generating a segmented, filtered document in accordance with examples described herein.

FIG. 7 shows a flowchart 700 that details a method of generating a segmented, filtered document 112 in accordance with examples described herein. The method begins at 702 wherein plain text data from the markup file 132 is obtained. Sections of the plain text data may be initially analyzed based on corresponding pages from the markup file 132 from which the sections are extracted. The text of a section is analyzed and the features in the section are obtained at 704. As mentioned herein, techniques such as but not limited to, pattern matching and NLP can be used to obtain the features of the section which can include but are not limited to, lexical features, language features and entity features.

Using a trained ML model and/or business rules such as relevance rules 254, it is determined at 706 whether the selected section is relevant to the analysis currently being executed by the document processing system 100. If the section is determined to be irrelevant, the section is deleted at 708 and the method moves to 708 to determine if further sections remain for analysis. If it is determined at 706 that the section is relevant, the method proceeds to 710 wherein it is determined if the section corresponds to a boundary page.

As mentioned herein, the electronic document 110 is a multi-document record including multiple component documents 111 which is converted to a multi-page markup file 132. A boundary page can be a page that is the last page of a component document within the electronic document 110 so that the next page in the electronic document 110 will belong to another component document. Again, ML techniques and boundary rules 252 can be used to determine if a section of the plain text data corresponds to a predicted boundary or a boundary page.

A prediction score is provided for the section based on the analysis of the features. The prediction score can be compared for example, to a boundary decision threshold so that the prediction score being above the boundary decision threshold may cause the page to be determined as a boundary page. If it is determined at 710 that the section does not correspond to a boundary page, the method proceeds to 712 wherein the section is included in the filtered, segmented document prior to determining at 716 if more sections remain to be analyzed. If it is determined at 710 that the section corresponds to a boundary page, the boundary of within the plain text data is set after the section at 714 prior to determining at 716 if more sections exist for analysis. If yes, the method returns to 702 to select the next section for processing else the method terminates on the end block.

A use case for the document processing system 100 in the healthcare domain is discussed below for illustration purposes. The user interfaces discussed below also pertain to the healthcare domain and illustrate the functioning of the document processing system 100 with reference to an electronic health record as an example of the electronic document 110. However, it can be appreciated that similar use cases, systems and methods discussed herein can be implemented using the document processing system 100 in various other domains such as financial, manufacturing, legal, oil and gas, supply chain, retail, etc., to process other electronic documents such as invoices, contracts, loan documents, social media messages, proposals, claims and the like which are digitized into non-editable formats for extraction and validation of data. The document processing system 100 finds application across the various domains as improvements in speed and accuracy of processes such as but not limited to simple search/locate, analytics and business intelligence, customer service and sentiment analysis, case management, legal discovery, report generation and the like are enabled in accordance with examples disclosed herein.

Figure 8:
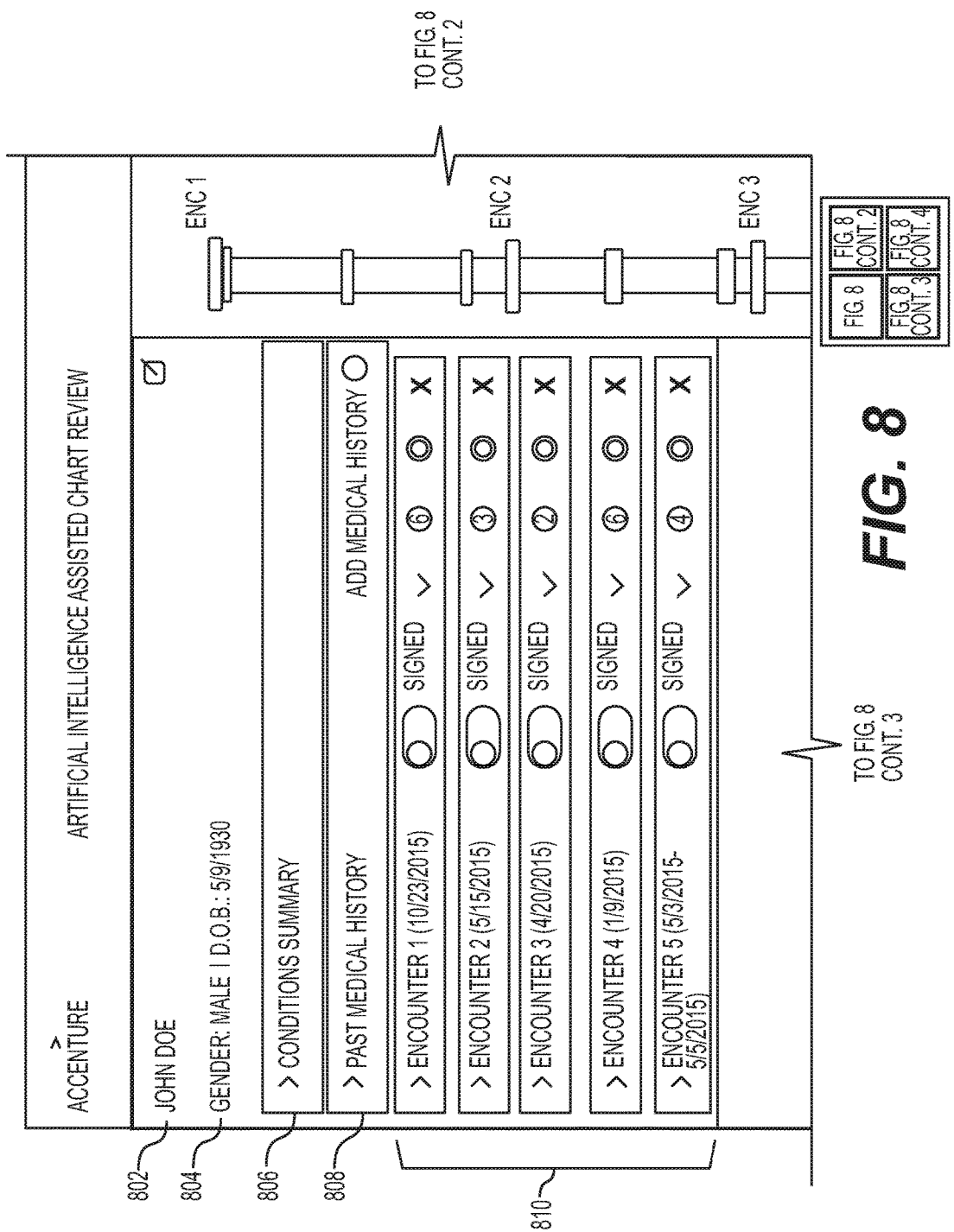
Figure 8:
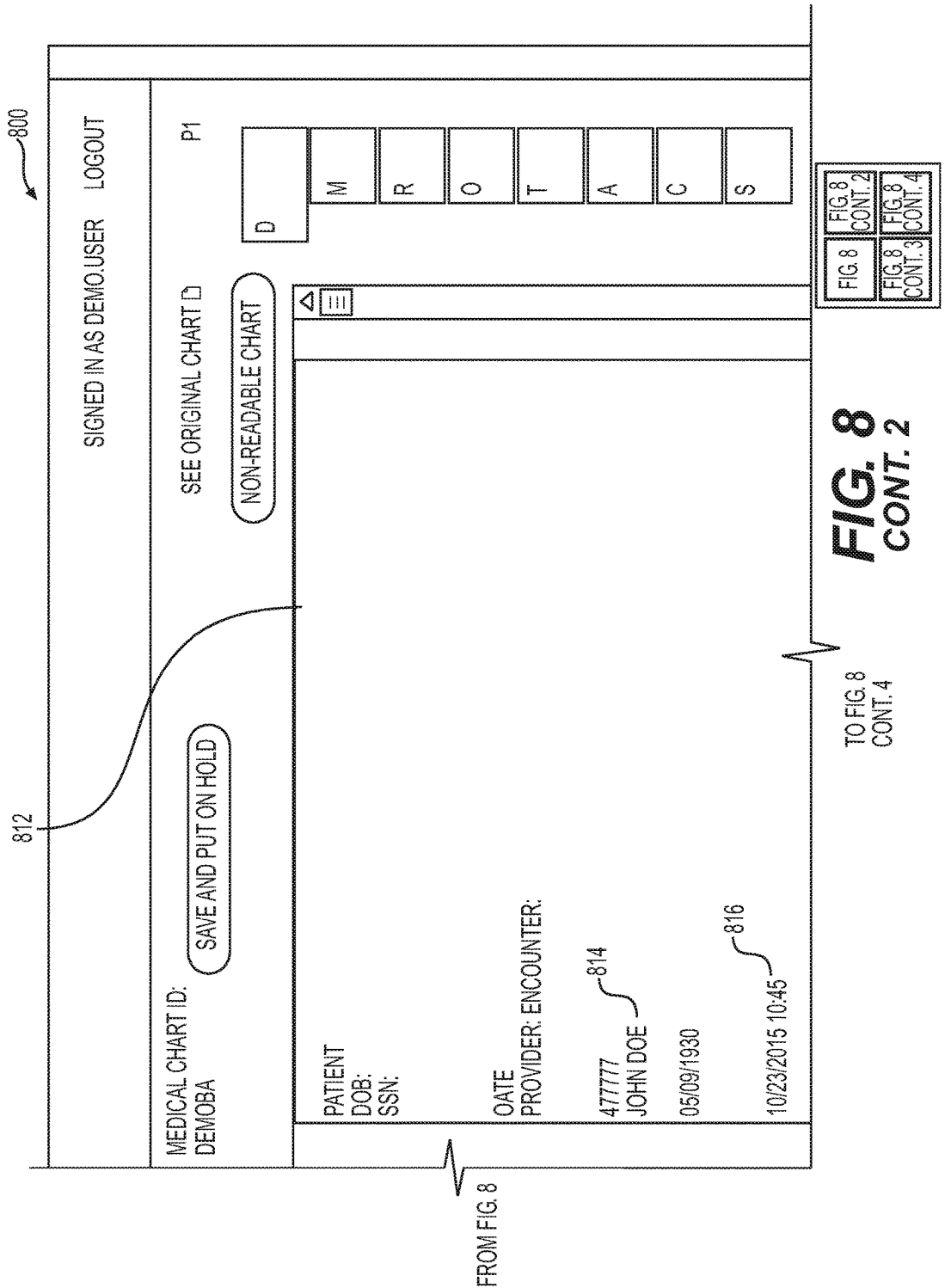

FIG. 8 illustrates a GUI 800 of the document processing system 100 for reviewing an EHR of a patient 802. The EHR is processed in accordance with methodologies disclosed herein to extract details 804 regarding the patient that can correspond to the entities 142 such as the date of birth and gender which are included near the patient's name on the left hand side (LHS) of the GUI 800. The LHS includes a conditions summary 806 corresponding to the condition entities 342, past medical history 808 and a listing 810 of the details of the various encounters or patient consultations such as the number of documents of the encounters etc. are included in the EHR being displayed for review. In an example, the LHS can be domain specific so that different electronic documents associated with different domains may have information displayed on a GUI tailored for the relevant information of the domain. The right hand side (RHS) portion 812 of the GUI 800 includes text (without annotations) extracted from the various component documents of the EHR including entities such as patient name 814, date and time of the encounter 816, provider identity 818 and the like.

FIG. 9 shows two GUIs 900 and 950 wherein the GUI 900 includes plain text extracted from a markup document generated from an EHR while the GUI 950 includes textual information along with the structural and formatting details. The GUI 950 displays styled textual information such as bolded text 954 or center alignment 956 as included in the original documents of the EHR along with the data presentation structures such as table 952.

The styling annotations shown in GUI 950 correspond to the styling and formatting from the original component documents that constitute the EHR. Therefore, the GUI 950 provides a reviewer a display of the original component documents of the EHR while simultaneously extracting intelligence from the EHR to enable analysis of evidences, confirmation of conditions, proposing other likely simultaneous or alternate conditions that may exist and the like. Such intelligent functions are not available with disparate information resources such as paper documents, database files, device logs etc. from which the EHR is generated which would require review by a knowledgeable human user.

Figure 10:
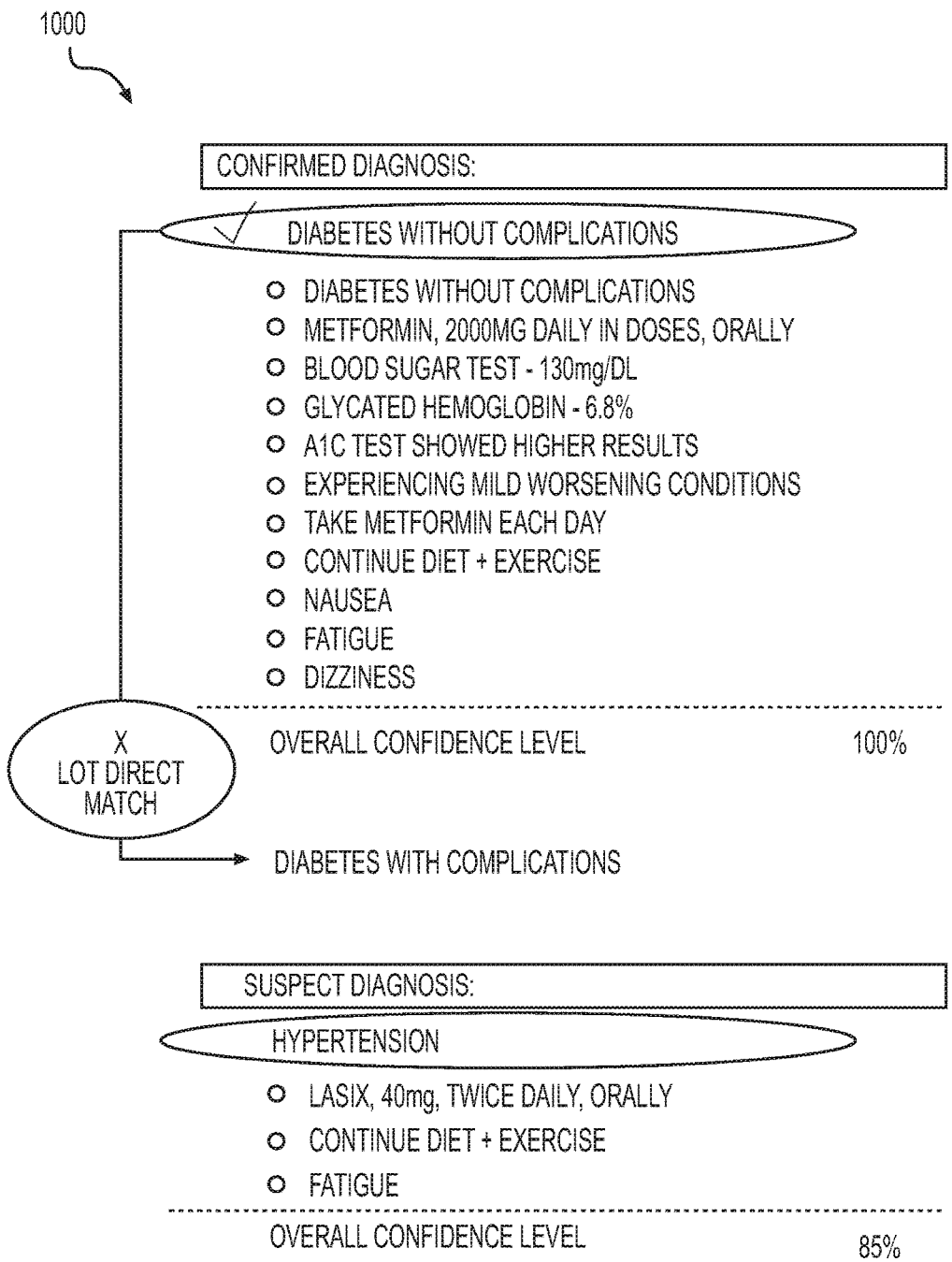

The scoring and ranking of condition entities can be employed for verifying a diagnosis in accordance with an example. FIG. 10 shows a GUI 1000 that displays a use case wherein confidence levels are assigned to different diagnoses extracted by the document processing system 100 from an EHR. By the way of illustration, a diagnosis put forth in an EHR may be reviewed for accuracy via entity processing methodologies disclosed herein. For example, a condition entity associated with a different condition other than that proposed in the EHR may be ranked as the most representative of the patient's condition by the document processing system 100. Alternately, one or more secondary conditions with substantial scores that are close to the top score within the condition entities may also be identified from the analysis of the EHR by the document processing system 100. The document processing system 100 may therefore be used to verify or validate the conclusions in the EHR. In addition, the information obtained by the document processing system 100 may aid in urgency detection wherein certain codes are associated with urgent conditions so that the unstructured documents including those codes are automatically moved to the top of an EHR queue for processing. Similarly, the codes associated with different conditions, tests, service providers and the like can be automatically routed to particular teams or departments for processing.

A diagnosis, namely diabetes without complications was put forth by a clinician within the EHR shown in the GUI 1000. There is an overlap of symptoms, treatments and medications between diabetes without complications and diabetes with complications. Upon analyzing the various entities within the EHR along with their links using the knowledge bases 170 and the various medical ontologies, the document processing system 100 can assign particular confidence values to each of the diagnoses. Accordingly, a confidence value of 100% is assigned to diabetes without complications. In addition, a suspect diagnosis of hypertension is also put forth by the document processing system 100 with an overcall confidence value of 85%.

The confidence values are automatically derived by the document processing system 100 using the information in the EHR by creating associations between the condition entities (diagnoses) and the evidence entities (evidence supporting each of the diagnoses) and estimating the scores of each. Based on the respective scores, the best or the highest scoring diagnosis is displayed to the user of the document processing system 100. The document processing system 100 therefore, determines accuracy of diagnosis proposed in the electronic document 110 based on the documentation, tests, symptoms, medications and the like. If the proposed diagnosis is not one of the top scoring condition entities, then a top scoring condition entity may be proposed as an alternate or suspect diagnosis which warrants further research and/or documentation.

The document processing system 100 in accordance with an example described herein provides a technical improvement over existing document processing systems and methods. While digitized forms, letters and other documents are conducive for storage to digital hardware the documents have to be manually reviewed to verify any conclusions or to obtain certain facts. While keyword searches and other scrolling or document hopping features afforded by the computing devices ease the review process, finding conditions and supporting evidences requires that a human reviewer read and understand the information within each component document of the electronic document 110.

For example, when claim documents are reviewed by a user in an insurance firm, the reviewer is not only required to identify the conditions claimed and supporting evidences but also needs to review insurance benefits for that patient, medical policy, patient history and the like. Due to the complexity of the task, manual review is time consuming and prone to error as conditions/evidences may be missed. Automating such tasks requires computers to analyze heterogeneous collections of EHRs, Explanation of benefits (EOBs) and other documents. EHRs of different patients from various service providers may include documents of different formats some of which may include typed textual data while others may include handwritten text, some of the data may be presented tables, graphs or other non-textual formats. The document processing system 100 saves time and effort by analyzing such heterogeneous documents of myriad formats to identify and evaluate information presented therein. Moreover, the interactive GUI permits users to edit data or information derived from static EHRs thereby improving knowledge bases with user feedback.

In addition to the above tasks, other functionalities of a health care platform such as a policy recommendation procedure can be implemented using the document processing system 100. For example, the entity link predictor 308 may be employed to identify and prioritize the applicable policies based on the procedure codes, diagnosis codes and supporting documentation. Tasks such as but not limited to, recommendations for auto-authorizations, marking for clinical review, obtaining the correct reference document and the like are also enabled by the document processing system 100.

For example if a code associated with a test has three different policies associated with it, the entity link predictor 308 can be configured to select one of the policies for review based on the type of supporting documents found with the unstructured document from which the code was extracted. Rules for routing the correct medical policy to a combination of the CPT code and diagnostic code combination can be implemented by the entity link predictor 308. Workflow rules to route cases to providers, clients, QA etc. based on user feedback can also be implemented. For example, if an authorization does not have the necessary information filled out, the form can get routed to the concerned provider for completion.

Figure 11:
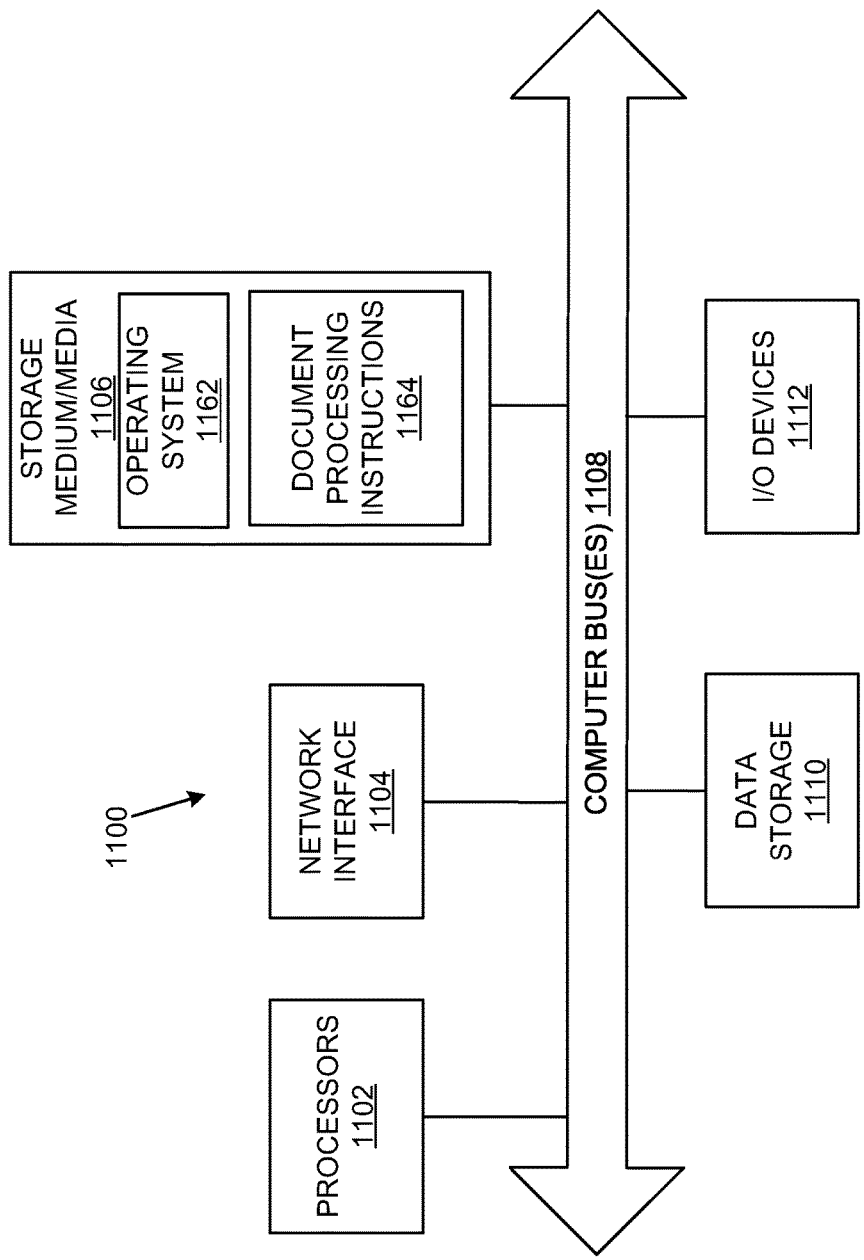
FIG. 11 illustrates a computer system that may be used to implement the document processing system in accordance with examples described herein.

FIG. 11 illustrates a computer system 1100 that may be used to implement the document processing system 100. More particularly, computing machines such as desktops, laptops, smartphones, tablets, wearables which may be used to generate or access image files corresponding to unstructured documents and their component documents 111 may have the structure of the computer system 1100. The computer system 1100 may include additional components not shown and that some of the components described may be removed and/or modified.

The computer system 1100 includes processor(s) 1102, such as a central processing unit, ASIC or other type of processing circuit, input/output devices 1112, such as a display, mouse keyboard, etc., a network interface 1104, such as a Local Area Network (LAN), a wireless 802.11x LAN, a 3G or 4G mobile WAN or a WiMax WAN, and a computer readable storage medium 1106. Each of these components may be operatively coupled to a bus 1108. The computer readable storage medium 1106 may be any suitable medium which participates in providing instructions to the processor(s) 1102 for execution. For example, the computer readable storage medium 1106 may be non-transitory or non-volatile medium, such as a magnetic disk or solid-state non-volatile memory or volatile medium such as RAM. The instructions or modules stored on the computer readable medium 1106 may include machine readable instructions 1164 executed by the processor(s) 1102 to perform the methods and functions of the document processing system 100.

The document processing system 100 may be implemented as software stored on a non-transitory computer readable medium and executed by one or more processors. For example, the computer readable medium 1106 may store an operating system 1162, such as MAC OS, MS WINDOWS, UNIX, or LINUX, and code or machine readable instructions 1164 for the document processing system 100. The operating system 1162 may be multi-user, multiprocessing, multitasking, multithreading, real-time and the like. For example, during runtime, the operating system 1162 is running and the code for the document processing system 100 is executed by the processor(s) 1102.

The computer system 1100 may include a data storage 1110, which may include non-volatile data storage. The data storage 1110 stores any data used by the document processing system 100. The data storage 1110 may be used to store real-time data from the unstructured document processes to automatically extract entities, score and rank the entities, confirm diagnoses and the like.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A document processing system that extracts editable data from electronic documents, the system comprising:
   one or more processors; and
   a non-transitory data storage comprising machine-executable instructions that cause the one or more processors to:
   convert a non-editable image file into a markup file,
      the non-editable image file pertaining to an electronic document, and
      the electronic document including at least one component document, and
      the markup file preserving a format and a structure of the component document from the image file;
   parse the markup file to extract plain text data of the non-editable image file;
   determine styling information of the non-editable image file from the markup file;
   automatically segment into sections, the plain text data by analyzing contents of the markup file according to boundary rules;
   identify and extract entities automatically from the segmented sections of the plain text data,
      the identifying performed using natural language processing (NLP);
   link the entities using at least one of:
      domain-specific ontologies,
      knowledge bases, and
      graphical inferences;
   generate an interactive graphical user interface (GUI),
      the GUI displaying content,
      the content including the plain text data formatted according to the styling information,
      the GUI including annotated entity relationships determined from the linked entities, and
      the GUI enabling user interactions for editing one or more of the content and the annotated entity relationships; and
   transmit user edits of one or more of the entity relationships, the content, the structure and the format to the knowledge bases.

2. The system of claim 1, wherein the instructions to convert the non-editable image file into the markup file further comprise instructions that cause the one or more processors to:
   identify features of textual data within the non-editable image file using optical character recognition;
   determine non-textual details including document structure of the component document;
   obtain markup tags associated with features of the textual data and the non-textual details; and
   generate the markup file by applying the markup tags to the textual data per the document structure.

3. The system of claim 1, wherein the instructions to automatically segment the plain text data further cause the one or more processors to:
   predict whether each section of the plain text data corresponding to a page of the markup document represents a document boundary,
      the predicting performed using a trained machine learning (ML) boundary model and the boundary rules.

4. The system of claim 3, wherein the instructions to automatically segment the plain text data further cause the one or more processors to:
   create a page break at a predicted boundary between the sections.

5. The system of claim 3, wherein the instructions to automatically segment the plain text data further cause the one or more processors to:
   predict whether a section of the plain text data is relevant or irrelevant to a current task using relevance rules; and
   remove non-relevant sections from the plain text data.

6. The system of claim 1, wherein the instructions to automatically identify and extract entities further cause the one or more processors to:
   identify the entities in the plain text data using the domain-specific ontologies and the knowledge bases; and
   categorize the entities into condition entities and evidence entities based on respective semantic type of the entities.

7. The system of claim 1, wherein the instructions to automatically identify and extract entities further cause the one or more processors to:
   assess relevance of the entities based on relevance rules that include analyzing at least a context surrounding the entities in the plain text data; and
   remove from further processing, a subset of the entities based on relevance rules.

8. The system of claim 1, wherein the instructions to link the entities further cause the one or more processors to:
   identify the links from evidence entities to condition entities using domain-specific ontologies; and
   discover new candidate links between the condition entities and the evidence entities by employing knowledge graphs stored in the knowledge bases.

9. The system of claim 8, wherein the non-transitory data storage comprising instructions that further cause the one or more processors to:
   assign each condition entity a score based on features of a condition represented by the condition entity; and
   rank the condition entities based on respective scores.

10. The system of claim 9, wherein the instructions to rank the condition entities further cause the one or more processors to:
    for each condition entity:
       score evidence entities corresponding to each of the condition entities based on properties of the evidence entities;
       rank the evidence entities based on respective scores; and
       select a top N scoring evidence entities as most indicative evidence for the condition entity.

11. The system of claim 1, wherein the instructions to link entities further cause the one or more processors to:
    invalidate a subset of links between evidence entities and condition entities in the domain-specific ontologies wherein the subset of the links are deleted.

12. The system of claim 1, wherein the electronic document is an unstructured document.

13. A computer-implemented method of processing an electronic document comprising:

receiving the electronic document including component documents,
   the component documents being produced from different data sources;
extracting plain text data of the component documents;
obtaining document structure information and styling information of the electronic document from the component documents;
automatically segmenting into sections, the plain text data,
   the automatically segmenting performed by analyzing contents of the component documents using boundary rules, and
   the boundary rules specifying grouping constraints on the plain text data;
extracting entities automatically from the plain text data using machine learning (ML), natural language processing (NLP) and entity recognition (ER);
categorizing the entities into one of condition entities or evidence entities that support the condition entities based on an entity type;
linking the supporting evidence entities to the condition entities within the plain text data;
confirming accuracy of a condition presented in the electronic document if a score of one of the condition entities associated with the condition is a highest score among scores of the condition entities present in the electronic document; and
causing to display on an interactive GUI, another of the condition entities with the highest score among the scores of the condition entities as an indicator of an accurate condition if the score of the condition entity associated with the condition is not highest among scores of the condition entities present in the electronic document.

14. The method of claim 13, further comprising:
scoring the condition entities using domain-specific ontologies and inferences from knowledge bases; and
ranking the condition entities based on the scores of the condition entities.

15. The method of claim 13 wherein extracting entities automatically from the plain text data using ML further comprises:
identifying dates in the plain text data; and
determining boundaries between the sections of the plain text data based at least on the dates.

16. The method of claim 13 wherein the electronic document is an unstructured document, and extracting the plain text data from the component files further comprises:
generating a markup file from the unstructured document,
   the markup file including information from the unstructured document, and
   the information being styled and formatted as presented in the component documents; and
parsing the markup file for the extraction of the plain text data.

17. The method of claim 13 wherein the electronic document is a structured document.

18. The method of claim 13, further comprising:
enabling user interactions for editing boundaries between the sections, the condition entities, the evidences entities and relations therebetween;
transmitting user edits to one or more of content, structure and format to knowledge bases; and
enabling updates to knowledge graphs within the knowledge bases so that future queries to the knowledge bases receive responses that include the user edits.

19. A non-transitory storage medium comprising machine-readable instructions that cause at least one processor to:
convert a non-editable image file pertaining to an electronic document including at least one component document into a markup file, wherein the markup file preserves formatting and structure of the component document from the image file;
parse the markup file to extract plain text data of the image file and styling information pertaining to the formatting and document structure information of the image file;
automatically segment into sections the plain text data, by analyzing contents of the markup file using at least boundary rules;
identify and extract entities automatically from the plain text data using natural language processing (NLP);
link the entities within the plain text using domain-specific ontologies, knowledge bases and graphical inferences;
generate an interactive GUI that displays content including the plain text data formatted according to the styling information,
   the GUI including annotated entity relations derived from the electronic document, and
   the GUI enabling user interactions for editing the boundaries, condition entities and evidences entities and relations therebetween; and
transmit user edits to one or more of the content, structure and format to the knowledge bases.

20. The non-transitory storage medium of claim 19, wherein the instructions for linking entities further comprise instructions to:
categorize the entities into one of condition entities or evidence entities based on an entity type; and
link each of the condition entities to one or more of the evidence entities within the plain text using domain-specific ontologies, knowledge bases and graphical inferences.

* * * * *